(12) United States Patent
Takagi et al.

(10) Patent No.: US 9,068,320 B2
(45) Date of Patent: Jun. 30, 2015

(54) MOUNTING BASE

(75) Inventors: Kazumasa Takagi, Tokyo (JP); Eizou Takagi, Tokyo (JP)

(73) Assignee: Marutaka-Kogyo Inc., Tokyo (JP)

( * ) Notice: Subject to any disclaimer, the term of this patent is extended or adjusted under 35 U.S.C. 154(b) by 0 days.

(21) Appl. No.: 13/993,818

(22) PCT Filed: Dec. 15, 2011

(86) PCT No.: PCT/JP2011/078996
§ 371 (c)(1),
(2), (4) Date: Jun. 3, 2014

(87) PCT Pub. No.: WO2012/081652
PCT Pub. Date: Jun. 21, 2012

(65) Prior Publication Data
US 2014/0311068 A1 Oct. 23, 2014

(30) Foreign Application Priority Data

Dec. 15, 2010 (JP) .................................. 2010-279067
Dec. 14, 2011 (JP) .................................. 2011-272951

(51) Int. Cl.
*E02D 27/32* (2006.01)
*E04D 13/14* (2006.01)
(Continued)

(52) U.S. Cl.
CPC ............ *E02D 27/32* (2013.01); *E04D 13/1407* (2013.01); *F16M 9/00* (2013.01); *F24F 13/32* (2013.01); *F24J 2/5245* (2013.01); *F24J 2/525* (2013.01); *Y02E 10/47* (2013.01); *E02D 27/01* (2013.01); *E02D 27/50* (2013.01)

(58) Field of Classification Search
CPC ......... E02D 27/32; E02D 27/01; E02D 27/50; E02D 27/42; E04D 13/1407
USPC ............... 52/58, 173.1, 219, 244, 300, 169.9, 52/296; 126/623
See application file for complete search history.

(56) References Cited

U.S. PATENT DOCUMENTS 4,275,538 A * 6/1981 Bounds ........................... 52/299
5,224,313 A * 7/1993 Guillebeau, III ............... 52/297
(Continued)

FOREIGN PATENT DOCUMENTS

JP           9-70188        3/1997
JP           2003-138699    5/2003
(Continued)

OTHER PUBLICATIONS

Translation of Akitaya JP 2009-167754 provided on Espacenet.*

*Primary Examiner* — Brian Glessner
*Assistant Examiner* — Brian D Mattei
(74) *Attorney, Agent, or Firm* — Clark & Brody

(57) ABSTRACT

A mounting base (10A) that shortens construction time and reduces cost is formed from a metal foundation (16), a metal cover (17), height-adjusting bolts (18), support bolts (19), and mortar (20). In the base (10A), the first fixed ends (47) of the bolts (19) are inserted into support bolt insertion holes (39) formed in a metal plate (24) and are fixed to the metal plate (24) with nuts (50), and the second fixed ends (48) of the bolts (19) are fixed to a concrete slab (12) with nuts (51). The portion of the first fixed ends (47) of the bolts (19) which extends between the metal plate (24) and the top surface of the concrete slab (12) is integrated with the mortar (29) filled into the space (46), and the metal cover (17) covers the opening (27) at the top of a metal tube (23).

10 Claims, 22 Drawing Sheets

(51) Int. Cl.
*F16M 9/00* (2006.01)
*F24J 2/52* (2006.01)
*E02D 27/01* (2006.01)
*E02D 27/50* (2006.01)
*F24F 13/32* (2006.01)

(56) References Cited

U.S. PATENT DOCUMENTS

2003/0014926 A1* 1/2003 Champa et al. ............... 52/60
2003/0079424 A1* 5/2003 Menzies .................. 52/220.8
2014/0196385 A1* 7/2014 Demster .................. 52/173.1

FOREIGN PATENT DOCUMENTS

| JP | 2009-167754 | 7/2009 |
| JP | 3164441 | 11/2010 |

\* cited by examiner

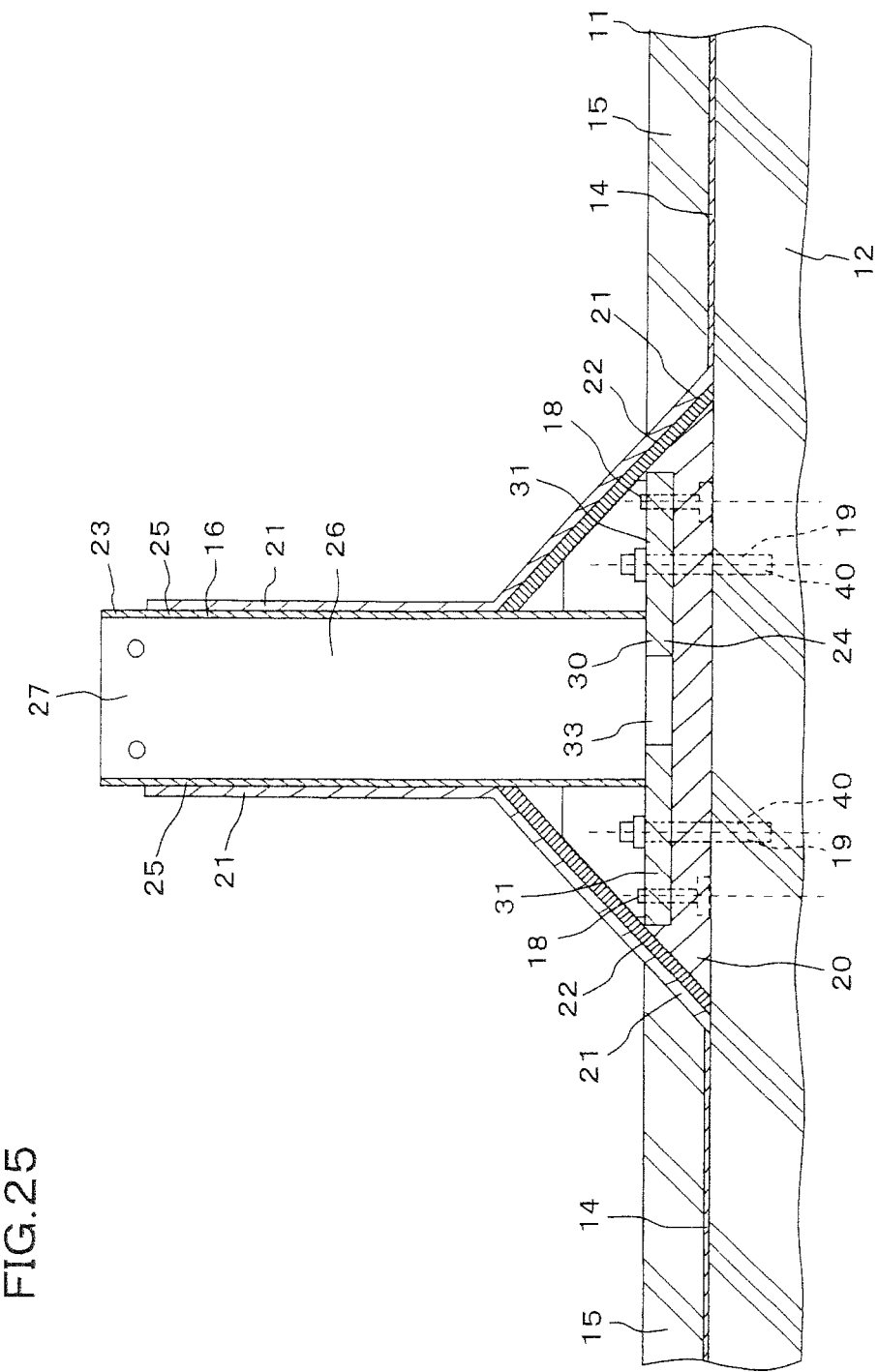

MOUNTING BASE

TECHNICAL FIELD

The present invention relates to a mounting base, and more particularly, a mounting base used for installing a solar panel, an antenna, a water tank, a septic tank, a mechanical appliance such as an air-conditioning apparatus, and a structure such as a steel tower and a steel building on a new or existing concrete structure.

BACKGROUND ART

In a concrete structure made of a new or existing reinforced concrete or reinforced/steel-frame reinforced concrete, a solar panel, an antenna, a water tank, a septic tank, a mechanical appliance such as an air-conditioning apparatus, various structures such as a steel tower and a steel building are installed on a rooftop or underground slab. Normally, such a mechanical appliance or a structure are not directly installed on the surface of a slab, but installed on a mounting base installed on a slab in order to prevent water leakage inside the mechanical appliance or the structure and enable the maintenance thereof on the back side.

Illustrative example of the mounting base includes a solar battery panel mounting structure disclosed in Japanese Unexamined Patent Publication No. 9-070188. According to a conventional technology disclosed in the Japanese Unexamined Patent Publication No. 9-070188, a solar battery panel is installed at a construction site where a formwork is produced, a base is prepared by placing and curing concrete in the formwork, and a carried solar battery panel and a carried frame thereof are installed on the base. Amounting base of such a conventional technology unfortunately fails to produce a mounting structure in a short period of time due to on-site production of a formwork, resulting in costs and work and a long time of concrete curing in the formwork.

To solve the conventional technical problem, a solar battery panel mounting structure disclosed Japanese Unexamined Patent Publication No. 9-070188 is characterized in that a base made of concrete or reinforced concrete is produced at a base part manufacturing plant beforehand and its base is carried to a rooftop or underground construction site of a concrete structure. Afterward, a thin cement layer is formed at a mounting position in a rooftop or underground slab, and the base is placed on the cement layer serving as an adhesion layer to be integrated with the concrete slab, and a frame for installing a solar battery panel is installed on the base. A solar battery panel mounting structure disclosed in Japanese Unexamined Patent Publication No. 9-070188 is capable of saving work for producing a formwork at a construction site when forming a base for installing a solar battery panel, simplifying construction work at the construction site, and capable of shortening construction time by saving time for curing concrete.

PRIOR ART DOCUMENT

Patent Document

Patent Document 1: Japanese Unexamined Patent Publication No. 9-070188

SUMMARY OF THE INVENTION

Problem to be Solved by the Invention

In the solar battery panel mounting structure disclosed in said Japanese Unexamined Patent Publication No. 9-070188, a base must be produced by curing concrete at a base part manufacturing plant while concrete is not required to be cured at a construction site. This means that concrete curing is necessary to produce abase regardless of a site and it requires a long time. In addition, since a base produced has to be carried from the plant to the construction site, work for carrying a significant weight of a base is required, resulting in an inability to decrease work and costs for producing a base. Also, when a base produced at the factory is fixed on a slab, only such methods as fixing a concrete layer serving as an adhesion layer to the concrete slab and fitting a lower end of a base into a recessed portion by forming the recessed portion on a slab can be employed, so that the base fails to be firmly installed on the concrete slab.

The aim of the present invention is to provide a mounting base capable of decreasing the work and cost required for installation and capable of shortening construction time. Another aim of the present invention is to provide a mounting base capable of firmly installing a base on a new or existing concrete structure and capable of firmly installing a machine and equipment and a structure thereon.

Means for Solving the Problem

To solve said problem, the premise of the present invention is to provide a mounting base installed at a predetermined position of a new or existing concrete structure.

The present invention under said premise provides a mounting base comprising: a plurality of bolts that are inserted into bolt holes opening the concrete structure having fixed end portions fixed to the concrete structure and free end portions that upwardly extend from the concrete structure; a foundation that is upwardly spaced away from a top surface of the concrete structure at a predetermined interval; a cover that is installed on the foundation; a frame material that is provided between an outer circumferential edge of the foundation and the concrete structure that blocks a gap between the concrete structure and the outer circumferential edge of the foundation; and a cement cured object that is filled into a space surrounded by the concrete structure, the foundation and the frame material, wherein the foundation has a bottom plate facing the concrete structure and a hollow tubing material that upwardly extends from the bottom plate, wherein free end portions of the bolts are inserted into bolt holes opening the bottom plate and fixed to the bottom plate with a specific fixing means, and fixed end portions of the bolts are fixed to the concrete structure with a specific fixing means, and a portion of the free end portions of the bolts that extends between the concrete structure and the bottom plate is integrated with the cement cured object filled into the space, and the cover blocks an opening at the top of the tubing material. In the mounting base, the opening at the top of the tubing material is blocked by the cover just after filling the cement cured object into the space and prior to completion of a curing period of the cement cured object, the curing period of the cement cured object starts after the opening at the top of the tubing material is blocked by the cover, and a portion of the free end portions of the bolts that extends between the concrete structure and the bottom plate is integrated with the cement cured object after completion of the curing period.

As an illustrative example of the present invention, the bottom plate has a first portion that internally extends in a radial direction of the tubing material and a second portion that externally extends in a radial direction of the tubing material, wherein the bolts are inserted into bolt holes opening the second portion of the bottom plate and inserted into bolt holes of the concrete structure facing the second portion, and the free end portions of the bolts are fixed to the second portion with fixing means and the fixed end portions of the bolts are fixed to bolt holes of the concrete structure facing the second portion with fixing means, and the frame material is provided between the outer circumferential edge of the second portion of the bottom plate and the concrete structure that blocks a gap between the concrete structure and the outer circumferential edge of the second portion, and a portion of the free end portions of the bolts that extends between the concrete structure and the second portion of the bottom plate is integrated with the cement cured object filled into the space.

As another illustrative example of the present invention, the concrete structure is formed from a concrete skeleton, a waterproof layer provided on the concrete skeleton and a covering concrete provided on the waterproof layer, wherein the fixed end portions of the bolts are fixed to bolt holes opening the concrete skeleton obtained by removing the covering concrete and the waterproof layer from the concrete structure, and the bottom plate is upwardly spaced away from the concrete skeleton at a predetermined interval.

As another illustrative example of the present invention, the concrete structure is formed from a concrete slab, a concrete beam, a waterproof layer provided on the concrete slab and the beam and a covering concrete provided on the waterproof layer, wherein the bolts are inserted into bolt holes opening the second portion of the bottom plate and inserted into bolt holes opening the concrete slab obtained by removing the covering concrete and the waterproof layer from the concrete structure, and the tubing material and the first portion of the bottom plate are disposed on the concrete beam, the second portion of the bottom plate is disposed on the concrete slab, and the bottom plate is upwardly spaced away from the concrete slab and the concrete beam at a predetermined interval.

As another illustrative example of the present invention, the bolts are inserted into bolt holes opening the first portion of the bottom plate and inserted into bolt holes of the concrete structure facing the first portion, and the free end portions of the bolts are fixed to the first portion with fixing means and the fixed end portions of the bolts are fixed to the concrete structure facing the first portion with fixing means, and a portion of the free end portions of the bolts that extends between the concrete structure and the first portion of the bottom plate is integrated with the cement cured object filled into the space.

As another illustrative example of the present invention, the second portion of the bottom plate is linked to first side plates that upwardly stand from a circumferential edge thereof and second side plates that are positioned between the first side plates that upwardly stand from the second portion, and a space surrounded by the second portion of the bottom plate and the first side plates is partitioned on the foundation and the cement cured object is filled into the space.

As another illustrative example of the present invention, the second portion of the bottom plate is linked to first side plates that upwardly stand from a circumferential edge thereof and second side plates that are positioned between the first side plates that upwardly stand from the second portion, and a space surrounded by the second portion of the bottom plate and the first side plates is partitioned on the foundation and a top plate blocks the opening at the top of the space.

As another illustrative example of the present invention, the mounting base includes a waterproof layer covering the foundation, and a portion that externally extends from the second portion of the bottom plate of the waterproof layer is connected to a waterproof layer of the concrete structure.

As another illustrative example of the present invention, a fill hole for filling the cement cured object into the space between the concrete structure and the bottom plate is provided at a predetermined position of the bottom plate.

As another illustrative example of the present invention, a confirmation hole for confirming the state of the cement cured object filled into the space between the concrete structure and the bottom plate is provided at a predetermined position of the bottom plate.

As another illustrative example of the present invention, the mounting base includes height-adjusting bolts screwed into screwing holes opening the bottom plate that adjust the height dimension of the foundation, and the height dimension of the space and the height of the foundation from the concrete structure can be adjusted by adjusting the screwing position relative to the bottom plate of the height-adjusting bolts.

Advantageous Effect of the Invention

The mounting base according to the present invention is formed from a plurality of bolts, a foundation that is upwardly spaced away from a concrete structure at a predetermined interval, a cover that is installed on the foundation, a frame material that blocks a gap between the concrete structure and an outer circumferential edge of the foundation and a cement cured object that is filled into a space, wherein all of these general-purpose components are assembled in unit construction system at a construction site (mounting position), and it is not necessary to produce a formwork at a construction site when constructing a base and to cure a cement cured object at a base part manufacturing plant and a construction site to produce a base. A base can be constructed only by fixing a plurality of bolts to a bottom plate of the foundation and the concrete structure, filling a cement cured object into a space and fixing a cover to the foundation, thereby saving work, cost and time for producing a formwork and curing the cement cured object, simplifying construction work and significantly shortening construction time required therefor. In the mounting base, free end portions of bolts are fixed to the bottom plate of the foundation and fixed end portions of bolts are fixed to the concrete structure. After completion of a curing period of the cement cured object, bolt portions are integrated with the cement cured object, and the load on the base is borne by the bolts and the cement cured object, thereby firmly installing the base on the concrete structure and firmly installing a solar panel, an antenna, a water tank, a septic tank, and a mechanical appliance such as an air-conditioning apparatus, a structure such as a steel tower and a steel building thereon. In the mounting base, a cement cured object is filled into a space surrounded by the concrete structure, the bottom plate of the foundation and a frame material and the load on the base produced by installing a machine and equipment and a structure thereon is borne by the bolts and the cement cured object so that the base doesn't incline or collapse in an undesired manner due to uneven load distribution on the base to assuredly support the machine and equipment and the structure. In the mounting base, even if a gap between the concrete structure and an outer circumferential edge of the foundation is filled with the frame material to fill the cement cured object into said space, the cement cured object never leaks out of the gap (space). An opening of a tubing material can be blocked with the cover just after the cement cured object is filled into the space and prior to completion of a curing period of the cement cured object, and another base mounting work can be conducted accordingly. Thus, construction time corresponding to the curing period of the cement cured object can be shortened and construction time of a mounting base can be significantly shortened. In the mounting base, it is not necessary to install a formwork for curing the cement cured object near the outside of the outer circumferential edge of the foundation, thereby saving work, time and cost for installing a formwork.

The mounting base is characterized in that the bottom plate has a first portion and a second portion, and bolts are inserted into the second portion of the bottom plate and a concrete structure facing the second portion, free end portions of the bolts are fixed to the second portion and fixed end portions of the bolts are fixed to the concrete structure facing the second portion, and a frame material blocks a gap between the concrete structure and an outer circumferential edge of the second portion. A portion of the free end portions of the bolts that extends between the concrete structure and the second portion is integrated with a cement cured object filled into a space. In the above characteristic, it is not necessary to produce a formwork at a construction site when constructing a base and to cure a cement cured object at a base part manufacturing plant and a construction site to produce a base. A base can be constructed only by fixing a plurality of bolts to the second portion of the bottom plate of a light foundation and the concrete structure, filling a cement cured object into a space and fixing a cover to a foundation. Thus, work, cost and time required for producing a formwork and curing a cement cured object can be saved and construction work can be simplified, and construction time required therefor can be significantly shortened. In the mounting base, free end portions of the bolts are fixed to the second portion of the bottom plate and fixed end portions of the bolts are fixed to the concrete structure. Bolt portions are integrated with the cement cured object after completion of a curing period of the cement cured object and the load on the base is borne by the bolts and the cement cured object, thereby firmly installing the base on the concrete structure and firmly installing a solar panel, an antenna, a water tank, a septic tank, and a mechanical appliance such as an air-conditioning apparatus, a structures such as a steel tower and a steel building thereon. In the mounting base, the area of bottom plate can be secured by externally extending the bottom plate in the radical direction of a tubing material to form a second portion and the load on the base is borne with the bottom plate, and instead the radial size of the tubing material is made smaller to reduce the weight of the tubing material, thereby making the tubing material lighter and thus making the base lighter.

The mounting base is characterized in that fixed end portions of bolts are fixed to a concrete skeleton obtained by removing a concrete layer and a waterproof layer from a concrete structure, and a bottom plate is upwardly spaced away from the concrete skeleton, and even if a mounting position for installing a machines and equipment and a structure is on a slab having a waterproof layer provided with a waterproof function on a rooftop or underground part of an existing concrete, a base is installed on the concrete skeleton exposed after removing the waterproof layer at the mounting position, and the waterproof layer near the mounting position can be repaired just after the base is installed (a new waterproof layer is provided). Therefore, a base can be promptly installed to significantly reduce time required for installing the base.

The mounting base is characterized in that the concrete structure is formed from a concrete slab, a concrete beam, a waterproof layer and a covering concrete, and bolts are inserted into a second portion of a bottom plate of a foundation and inserted into a slab obtained by removing the covering concrete and the waterproof layer from the concrete structure. A tubing material and a first portion of the bottom plate are disposed on the beam, the second portion of the bottom plate is disposed on the concrete slab and the bottom plate is upwardly spaced away from the concrete slab and the beam at a predetermined interval. A base can be constructed only by fixing bolts to the second portion of the bottom plate of a light foundation and the concrete slab, filling a cement cured object into a space and fixing a cover to the foundation, thereby saving work and time required for producing a formwork and curing a cement cured object, simplifying construction work and significantly shortening construction time required therefor. In the mounting base, even if a mounting position thereof is on a slab and a beam having a waterproof layer provided with a waterproof function on a rooftop and underground part of an existing concrete structure, a base is installed on the concrete slab and the beam exposed after removing the waterproof layer at a mounting position, a waterproof layer near the mounting position can be repaired (a new waterproof layer is provided) just after installing the base, thereby promptly installing the base and significantly reducing time required for installing the base.

The mounting base is characterized in that bolts are inserted into a first portion of a bottom plate and a concrete structure facing the first portion of the bottom plate, and free end portions of the bolts are fixed to the first portion and fixed end portions of the bolts are fixed to the concrete structure facing the first portion, and a portion of the free end portions of the bolts that extends between the concrete structure and the first portion of the bottom plate is integrated with a cement cured object filled into a space. A base can be constructed only by fixing the bolts to the first and second portions of the bottom plate of a light foundation and the concrete structure, filling a cement cured object into a space and fixing a cover to a foundation, thereby saving work and time required for producing a formwork and curing the cement cured object, simplifying construction work and significantly shortening construction time required therefor. In the mounting base, free end portions of the bolts are fixed to the first and second portions of the bottom plate and fixed end portions of the bolts are fixed to the concrete structure. Bolt portions are integrated with the cement cured object after completion of a curing period of the cement cured object and the load on the base is borne by the bolts and the cement cured object, thereby firmly installing the base on the concrete structure and firmly installing a solar panel, an antenna, a water tank, a septic tank, and a mechanical appliance such as an air-conditioning apparatus, a structures such as a steel tower and a steel building thereon. In the mounting base, the cement cured object is filled into a space between the concrete structure and the bottom plate and the load on the base with a machine and equipment and a structure thereon is borne by the bolts and the cement cured object so that the base doesn't incline or collapse in an undesired manner by the load of the base to assuredly support the machine and equipment and the structure.

The mounting base is characterized in that a second portion of a bottom plate is linked to first side plates and second side plates, and a space surrounded by the second portion of the bottom plate and the first side plates is partitioned on a foundation to fill a cement cured object into the space. The first and second side plates serve as a reinforcing plate that increases the strength of the bottom plate, thereby preventing deformation and damage of the bottom plate by such a side plate. Therefore, the mounting base can be firmly installed on a concrete structure so that the base doesn't incline or collapse in an undesired manner by the load of the base to assuredly support a machine and equipment and a structure. In the mounting base, free end portions of bolts are not exposed into the space, and corrosion of the free end portions or loosening of the free end portions can be prevented, and release of fixation of the free end portions and the bottom plate from corrosion of the free end portion can be prevented and loss of functions of the base from loosening of fixation of the free end portions can be prevented.

The mounting base is characterized in that a second portion of a bottom plate is linked to first side plates and second side plates and a space surrounded by the second portion of the bottom plate and the first side plates is partitioned on a foundation to block an opening of the space with a top plate. The first and second side plates serve as a reinforcing plate that increases the strength of the bottom plate, thereby preventing deformation and damage of the bottom plate by such a side plate. Therefore, the mounting base can be firmly installed on a concrete structure so that the base doesn't incline or collapse in an undesired manner by the load of the base to assuredly support a machine and equipment and a structure. In the mounting base, free end portions of bolts are not exposed outside to prevent water leakage inside the space, thereby preventing corrosion of free end portions and release of fixation of the free end portions and the bottom plate from corrosion of the free end portions. In the mounting base, the opening of the space is blocked only with a top plate, thereby shortening a period for curing a cement cured object compared to a case where a cement cured object is filled into the space and shortening construction time corresponding thereto.

The mounting base is characterized in that a waterproof layer covering a foundation is included and a portion that externally extends from a second portion of a bottom plate of the waterproof layer is connected to a waterproof layer of a concrete structure. Even if the base is installed outside the concrete structure, the waterproof layer can prevent water leakage inside a foundation, thereby preventing corrosion of the foundation or reduction in strength from water leakage inside the foundation. Also, this structure can prevent water leakage inside the concrete structure and degradation of the concrete structure therefrom.

The mounting base is characterized in that a fill hole for filling a cement cured object into a space between a concrete structure and a bottom plate is prepared at a predetermined position of a bottom plate. The cement cured object can be filled into a space using the fill hole after fixing bolts to the bottom plate and the concrete structure to assuredly fill the cement cured object into the space. In the mounting base, the load on the base with a machine and equipment and a structure thereon can be borne by the bolts and the cement cured object so that the base doesn't incline or collapse in an undesired manner by the load on the base to assuredly support the machine and equipment and the structure.

The mounting base is characterized in that a confirmation hole for confirming the state of a cement cured object filled into a space between a concrete structure and a bottom plate is prepared at a predetermined position of the bottom plate. The state of the cement cured object filled into the space using the confirmation hole is confirmed in order to fill the cement cured object into the space completely evenly. In the mounting base, the load on the base with a machine and equipment and a structure thereon can be borne by the bolts and the cement cured object so that the base doesn't incline or collapse in an undesired manner by the load on the base to assuredly support the machine and equipment and the structure.

The mounting base is characterized in that height-adjusting bolts screwed into screwing holes opening a bottom plate that adjust the height dimension of a foundation are included and the base is capable of adjusting the height dimension of a space and adjusting the height dimension of the foundation from a concrete structure by adjusting a screwing position of the height-adjusting bolts relative to the bottom plate. The height dimension of the foundation can be changed during base construction and a requirement for changing the height dimension of the base can be promptly met by using the height-adjusting bolts. In the mounting base, the height dimension thereof can be readily adjusted and evenly determined when mounting a plurality of mounting bases.

BRIEF DESCRIPTION OF THE DRAWINGS

FIG. 25 is a diagram showing a construction process of a mounting base following FIG. 24.

BEST MODE FOR CARRYING OUT THE INVENTION

Figure 1:
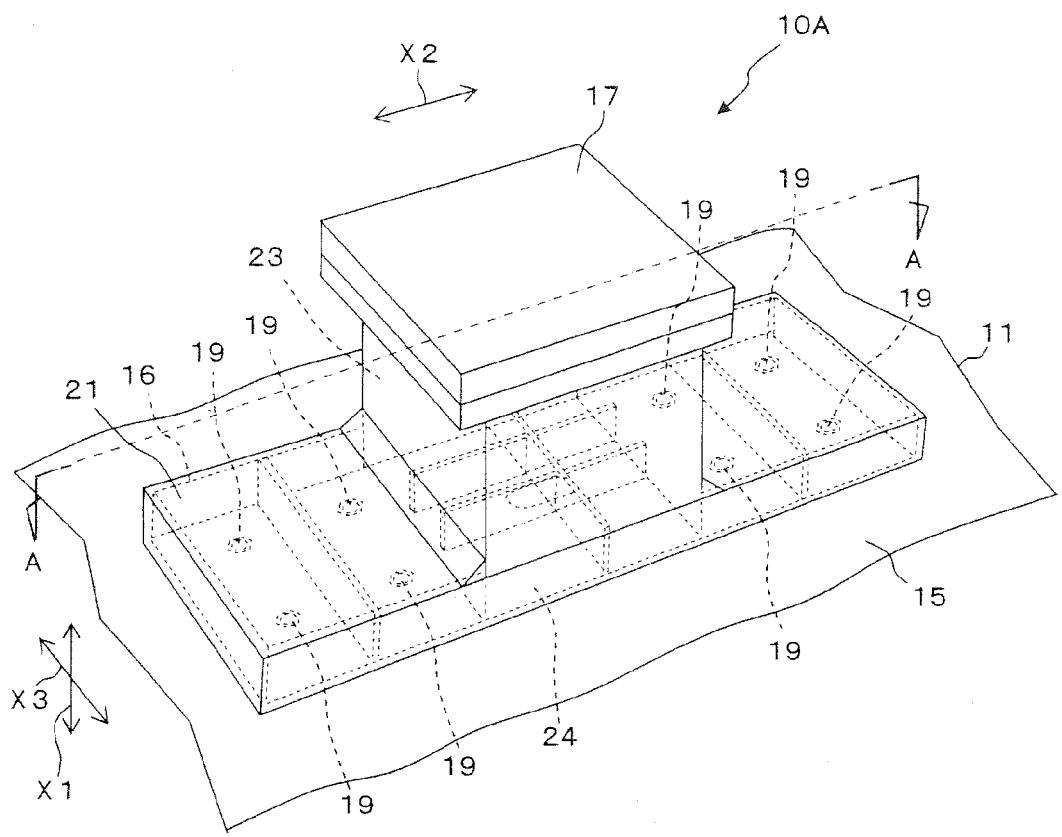
FIG. 1 is a perspective view of a mounting base showing one example.
Figure 2:
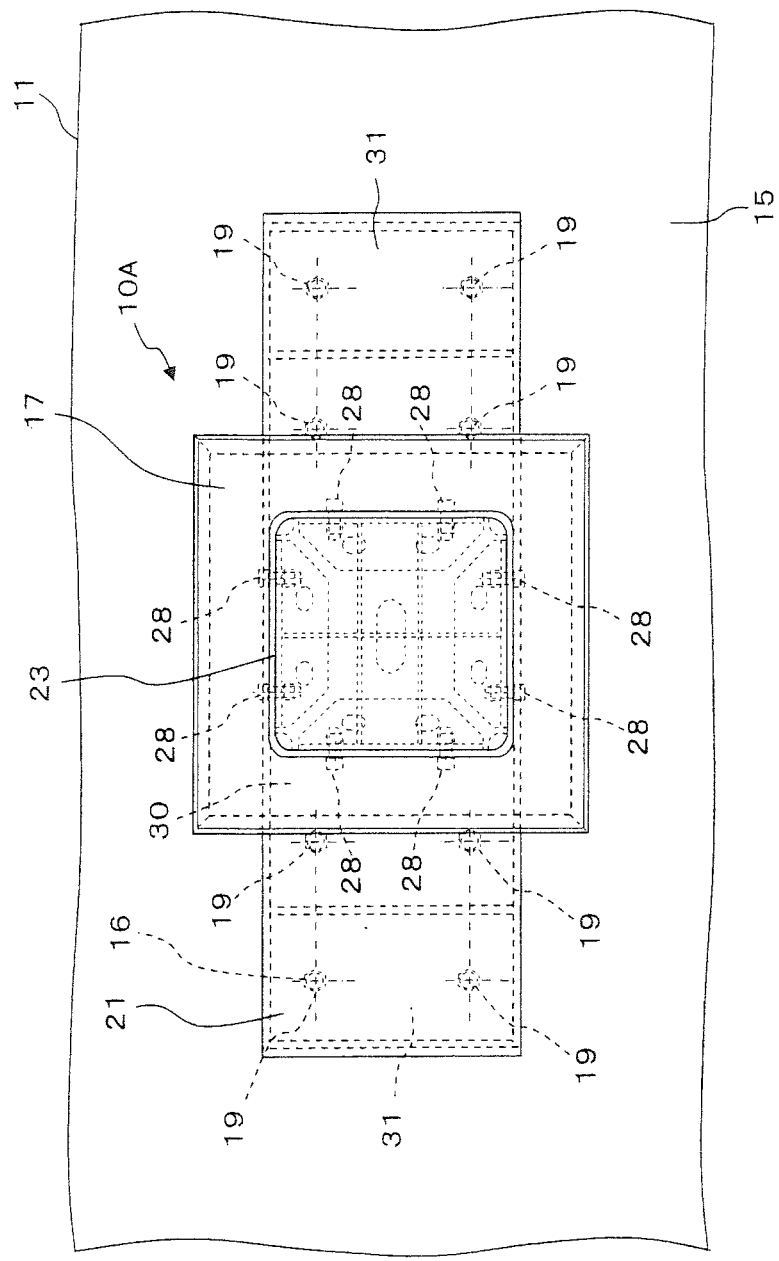
FIG. 2 is a diagram showing a top surface of a mounting base.
Figure 3:
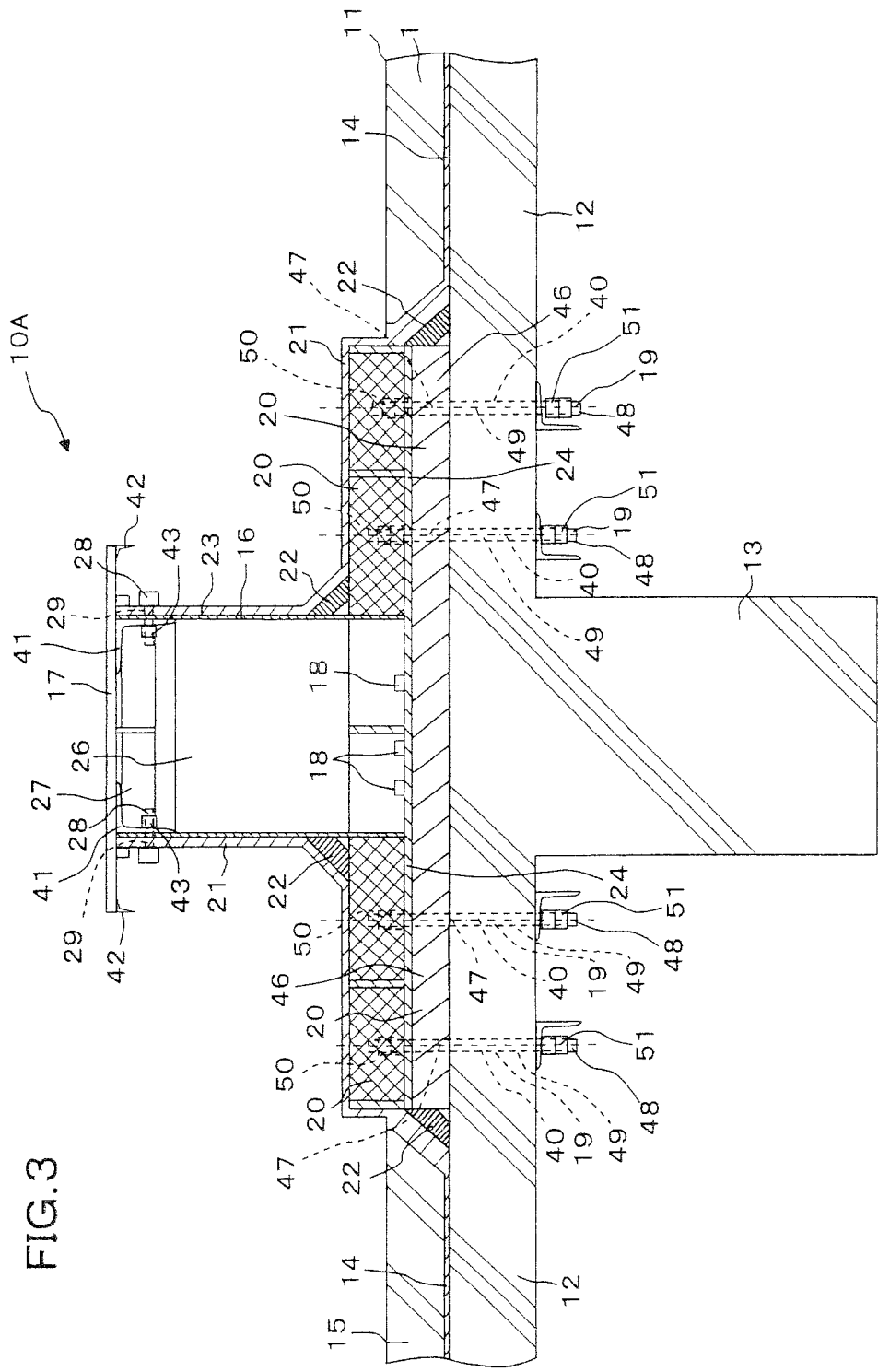
FIG. 3 is a sectional view taken from line A-A of FIG. 1.
Figure 4:
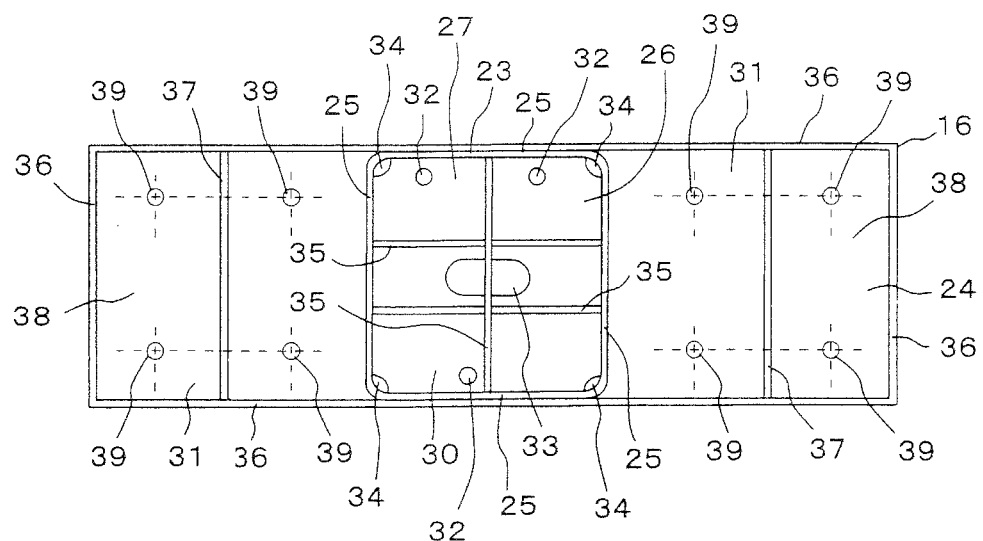
FIG. 4 is a diagram showing a top surface of a metal foundation.
Figure 5:
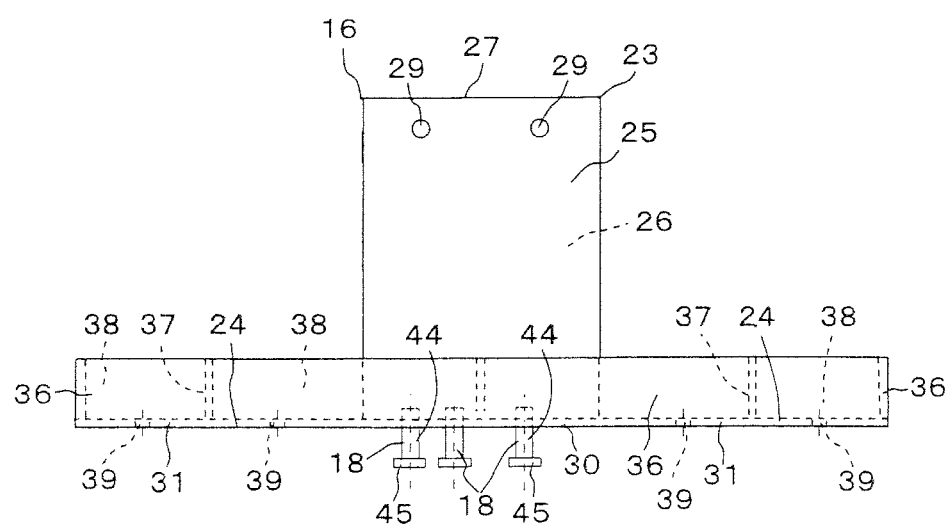
FIG. 5 is a side view of a metal foundation.

The mounting base of the present invention will be described in detail with reference to attached drawings such as FIG. 1 showing one example of a perspective view of a mounting base 10A. FIG. 1 shows one mounting base 10A installed on a concrete structure 11, but the number of bases 10A installed is not limited to the one shown and generally 2 or more bases 10A are installed on the concrete structure 11. FIG. 2 is a diagram showing a top surface of a mounting base 10A and FIG. 3 is a sectional view taken from line A-A of FIG. 1. FIG. 4 is a diagram showing a top surface of a metal foundation 16 and FIG. 5 is a side view of a metal foundation 16. In the FIG. 1, arrow X1 represents a vertical direction, arrow X2 a lateral direction and arrow X3 a longitudinal direction.

The mounting base 10A is installed at a predetermined mounting position of a rooftop and underground part of a new or existing concrete structure 11 (all types of structures including buildings). The mounting position is a intersecting position of a rooftop or underground slab and a beam. Herein, "slab" exactly means "floor slab," but in this embodiment, not only an underground floor of the concrete structure 11, but also a rooftop floor thereof.

The concrete structure 11 on which the base 10A is installed is, as shown in FIG. 3, formed from a concrete slab 12, a concrete beam 13, a waterproof layer 14 provided on the concrete slab 12 and the beam 13 and a covering concrete 15 provided on the waterproof layer 14. When the concrete structure 11 is constructed underground, it can be formed only of a slab 12 and a beam 13, without waterproof layer 14 or covering concrete 15. The concrete slab 12 and the beam 13 are provided with a plurality of reinforcing bars (not shown) laid therein.

The mounting base 10A is installed on the concrete slab 12 and the concrete beam 13 obtained by removing the covering concrete 15 and the waterproof layer 14 from the concrete structure 11. The mounting base 10A employs each of general-purpose (standardized) base components including a metal foundation 16 (foundation), a metal cover 17 (cover), a plurality of height-adjusting bolts 18, a plurality of support bolts 19 (anchor bolt), a mortar 20 (cement cured object), a waterproof layer 21 and a molding material 22 (frame material) assembled according to a process using a specific manual.

The metal foundation 16 is a standardized general-purpose product of the same shape and size. After a plurality of metal foundations produced at a base part manufacturing plant other than a construction site, they are carried to the construction site. The metal foundation 16 is disposed on the concrete slab 12 and the concrete beam 13 obtained by removing the covering concrete 15 and the waterproof layer 14 from the concrete structure 11. The metal foundation 16 is formed from a hollow tubular metal tube 23 (tubing material) and a metal plate 24 (bottom plate) with an approximately rectangular planar shape. The metal foundation 16 is produced by welding the metal tube 23 on a top surface of the metal plate 24. The metal tube 23 and the metal plate 24 are made of a metal such as iron, aluminum or alloy.

In the metal foundation 16, the metal tube 23 forming thereof (including a later-mentioned first portion 30 of the metal plate 24) is disposed just above the concrete beam 13, and a later-mentioned second portion 31 of the metal plate 24 is disposed just above the concrete slab 12. The metal foundation 16 is lighter than a reinforced concrete base, because a concrete portion is saved. Thus, the weight of the base 10A can be significantly reduced using the metal foundation 16.

The metal tube 23 has each side plate 25 in an approximately rectangular shape, and the section is formed in an approximately quadrangular shape. The metal tube 23 is disposed on a top surface in the middle of the metal plate 24, and a lower end edge thereof is welded to the top surface of the metal plate 24 to be jointed (fused together). In the metal tube 23, a hollow space 26 is partitioned by a side wall 25 thereof and a top of the metal tube 23 is formed from an opening 27 surrounded by upper end edges of the side plates 25. The top of the metal tube 23 is provided with a plurality of fixing bolt screwing holes 29 that screw cover fixing bolts 28. The fixing bolt screwing holes 29 are provided with female screws (not shown) that screw the cover fixing bolts 28.

The metal plate 24 has a first portion 30 that internally extends in a radial direction from a lower end edge of the metal tube 23 (or that internally extends in a lateral direction of the metal tube 23) and a second portion that externally extends in a radial direction from a lower end edge of the metal tube 23 (or that externally extends in a lateral direction of the metal tube 23). The first portion 30 is provided with a plurality of adjusting bolt screwing holes 32 that screw the height-adjusting bolts 18 (FIG. 4). The adjusting bolt screwing holes 32 are provided with female screws (not shown) screwed by the height-adjusting bolts 18. The number and position of the bolt screwing holes 32 at the first portion 30 are not particularly limited and the adjusting bolt screwing holes 32 can be provided at any position of the first portion 30.

The metal plate 24 is provided with an elliptical fill hole 33 for filling a mortar 20 in the middle of the first portion 30 thereof. Four corners of the first portion 30 are provided with a confirmation hole 34 for confirming the state of the mortar 20 filled (FIG. 4). The first portion 30 is provided with a plurality of reinforcing plates 35 that extend in lateral and longitudinal directions. The reinforcing plates 35 are welded to an inner surface of the metal tube 23 and a top surface of the metal plate 24 to be jointed (fused together). The reinforcing plate 35 serves as a reinforcing material that increases the strength of the metal tube 23 and the metal plate 24.

The second portion 31 of the metal plate 24 has a both end edge (circumferential edge) that laterally extends and a both side edge (circumferential edge) that longitudinally extends. Rectangular first side plates 36 that upwardly stand from an end edge along a both end edge thereof are welded to the second portion 31 to be jointed (fused together) and rectangular first side plates 36 that upwardly stand from a side edge along a both side edge thereof are welded to the second portion 31 to be jointed (fused together). The first side plates 36 linked to end edges of the second portion 31 (including the first portion 30) laterally extend parallel to one another. The first side plates 36 linked to side edges of the second portion 31 longitudinally extend parallel to one another.

Rectangular second side plates 37 positioned between the first side plates 36 that upwardly stand from the second portion 31 are welded to the second portion 31 of the metal plate 24 to be jointed (fused together). The second side plates 37 longitudinally extend parallel to one another. The first and second side plates 36, 37 serve as a reinforcing plate that increases the strength of the second portion 31 of the metal plate 24. A space 38 surrounded by the second portion 31 of the metal plate 24 and the first side plates 36 is partitioned on the metal foundation 16. The space 38 is filled with the mortar 20 (cement cured object), which is cured into the space 38 (FIG. 3). A metal top plate (not shown) is disposed on a top surface of the second portion 31 of the metal plate 24, and the top plate may block an opening of the space 38. In this case, the mortar 20 is not filled into the space 38, and the top plate is welded to an upper end edge of the first and second side plates 36, 37 to be jointed (fused together).

The second portion 31 of the metal plate 24 is provided with a plurality of support bolt insertion holes 39 (bolt hole) that insert the support bolts 19. The support bolt insertion holes 39 are provided using a drill, which vertically pass through the second portion 31 of the metal plate 24. The support bolt insertion holes 39 are aligned laterally and longitudinally at the second portion 31 with a predetermined interval. FIG. 4 shows 8 support bolt insertion holes 39 provided, but the number of support bolt insertion holes 39 is not specifically limited, but determined according to structural calculation (strength calculation) prior to mounting of the base 10A.

A position for installing a base of the concrete slab 12A is provided with a plurality of support bolt insertion holes 40 (bolt hole) that insert the support bolts 19. The support bolt insertion holes 40 are provided using a drill and vertically pass through the concrete slab 12 so that they don't contact with reinforcing bars laid in the concrete slab 12. The support bolt insertion holes 40 are positioned at the support bolt insertion holes 39 formed at the second portion 31 of the metal plate 24 when the metal foundation 16 is placed on a top surface of the concrete slab 12. The support bolt insertion holes 40 are aligned laterally and longitudinally at the concrete slab 12 with a predetermined interval.

The metal cover 17 is a standardized general-purpose product of the same shape and size. After a plurality of metal covers 17 are produced at a base part manufacturing plant other than a construction site, they are carried to the construction site. The metal cover 17 is made of a metal such as iron, aluminum and alloy, and a planar shape thereof is made in an approximately rectangular shape. On an undersurface of the metal cover 17 or inside a circumferential edge of the cover 17 is an angle bar 41 (steel material) for fixing the cover 17 to a top of the metal tube 23 welded to be jointed (fused together). On an undersurface of the metal cover 17 and a circumferential edge of the cover 17 is a drain angle bar 42 (steel material) welded to be jointed (fused together). The angle bar 41 is provided with fixing bolt insertion holes (not shown) that insert cover fixing bolts 28, and hexagonal nuts 43 are welded to the fixing bolt insertion holes to be jointed (fused together).

The metal cover 17 is fixed to a top of the metal tube 24 by the cover fixing bolts 28 inserted into the fixing bolt insertion holes provided at the angle bar 41 and the hexagonal nuts 43 attached to the angle bar 41 to block the opening 27 of the metal tube 24 in a watertight manner. The top surface of the metal cover 17 is provided with a fixed apparatus for installing a solar panel, an antenna, a water tank, a septic tank, and a mechanical appliance such as an air-conditioning apparatus, a structure such as a steel tower and a steel building (not shown).

The height-adjusting bolts 18 are hexagon head bolts formed from a threaded shaft 44 having a male screw (not shown) provided and a bolt head 45. The threaded shaft 44 of the height-adjusting bolts 18 is screwed beforehand into the adjusting bolt screwing holes 32 provided at the first portion 30 of the metal plate 24. In the bolt head 45, as the height-adjusting bolts 18 are rotated counterclockwise, the threaded shaft 44 of the bolts 18 slowly advances toward the bolt screwing holes 32 downward and extends from an undersurface of the first portion 30 downward to make the bolt head 45 abut against a top surface of the concrete beam 13. Accordingly, the metal foundation 16 can be spaced away from a top surface of the concrete slab 12 and the concrete beam 13 upwardly with a predetermined dimension. Conversely, as the height-adjusting bolts 18 are rotated clockwise, the threaded shaft 44 of the bolts 18 slowly advances toward the bolt screwing holes 32 upwardly and upwardly extends from an undersurface of the first portion 30. Accordingly, the metal foundation 16 can be closer to a top surface of the concrete slab 12 and the concrete beam 13.

As the height-adjusting bolts 18 are rotated in the adjusting bolt screwing holes 32, the metal plate 24 of the metal foundation 16 is upwardly spaced away from a top surface of the concrete slab 12 and the concrete beam 13, and a space 46 is formed with a predetermined height dimension between a top surface of the concrete slab 12 and the beam 13 and an undersurface of the metal plate 24. By adjusting the screwing position of the height-adjusting bolts 18 relative to the first portion 30 of the metal plate 24 of the metal foundation 16, the height dimension of the space 46 can be adjusted and the height dimension of the metal foundation 16 from a top surface of the concrete slab 12 and the concrete beam 13 can be adjusted within the length of the bolt 18.

The support bolts 19 are standardized general-purpose products of the same length and diameter. After a plurality of support bolts are produced at a base part manufacturing plant other than a construction site, they are carried to the construction site. The bolts 19 are made of a steel material, and are inserted into the support bolt insertion holes 39 provided at the second portion 31 of the metal plate 24 and inserted into the support bolt insertion holes 40 provided on the concrete slab 12 (concrete structure). The support bolts 19 have free end portions 47 that upwardly extend from a top surface of the concrete slab 12, fixed end portions 48 that downwardly extend from an undersurface of the concrete slab 12 and an intermediate portion 49 positioned in the support bolt insertion holes 40 of the concrete slab 12 that extends between the end portions 47, 48.

The free end portions 47 of the support bolts 19 are inserted into the support bolt insertion holes 39 opening the metal plate 24 and fixed to the metal plate 24 with hexagonal double nuts 50 (fixing means). The hexagonal double nuts 50 are attached to a portion of the free end portions 47 that upwardly extends from the metal plate 24. The fixed end portions 48 of the support bolts 19 are fixed to the concrete slab 12 with hexagonal double nuts 51 (fixing means). When the hexagonal double nuts 50, 51 are screwed into the end portions 47, 48 of the support bolts 19, the height dimension of the metal foundation 16 from a top surface of the concrete slab 12 and the concrete beam 13 is already adjusted by the height-adjusting bolts 18.

The mortar 20 is filled into a space 46 formed between a top surface of the concrete slab 12 and the concrete beam 13 and an undersurface of the metal plate 24. The mortar 20 is filled from the fill hole 33 formed on the metal plate 24. The mortar 20 filled into the space 46 is cured and the mortar 20 is jointed to a top surface of the concrete slab 12 and the concrete beam 13 and an undersurface of the first and second portions 30, 31 of the metal plate 24 and to the support bolt 19.

In the space 46, a portion of the free end portions 47 of the support bolts 19 that extends between a top surface of the concrete slab 12 and the second portion 31 of the metal plate 24 is integrated with the mortar 20. The cured mortar 20 bears the load on the base 10A (on the metal cover 17) with a solar panel, an antenna, a water tank, a septic tank, and a mechanical appliance such as an air-conditioning apparatus, a structure such as a steel tower and a steel building thereon together with the support bolts 19. As a cement cured object filled into the space 46, concrete can be used in addition to the mortar 20.

A trigonal prism-shaped molding material 22 (frame material) is provided at an intersecting portion of the metal tube 23 and the metal plate 24. The molding material 22 is secured to the metal tube 23 and the metal plate 24 with an adhesive agent (not shown) to surround the whole outer circumferential edge of the metal tube 23. The covering concrete 15 and the concrete slab 12 are provided with a trigonal prism-shaped molding material 22 (frame material). The molding material 22 is secured to the concrete slab 12 and the covering concrete 15 with an adhesive agent (not shown). The molding material 22 is provided between an outer circumferential edge of the metal foundation 16 (an outer circumferential edge of the metal plate 24) and the concrete slab 12 (the concrete structure) to surround the whole outer circumferential edge of the metal plate 24 and block a gap between the concrete slab 12 and an outer circumferential edge of the metal plate 24.

The waterproof layer 21 is provided outside each side plate 25 of the metal tube 23 to cover the whole side plate 25, and provided outside the metal plate 24 (on a top surface of the mortar 20 filed into the space 38 or a top surface of a top plate blocking the space 38) to cover the whole metal plate 24 and the whole first and second side plates 36, 37. The waterproof layer 21 is employed as an asphalt waterproof that forms asphalt sheet layers by laminating a plurality of thin asphalt sheets. The asphalt sheets are secured to the side plate 25 of the metal tube 23, the mortar 20, the first and second side plates 36, 37 and the molding material 22 with each distinct adhesive property. A portion that externally extends from the second portion 31 of the metal plate 24 of the waterproof layer 21 (an asphalt sheet secured to the molding material 22) is connected to the waterproof layer 14 of the concrete structure 11. As the waterproof layer 21, vinyl chloride sheet waterproof, rubber sheet waterproof, urethane waterproof, epoxy waterproof, or FRP waterproof can be used in addition to the asphalt waterproof.

Figure 6:
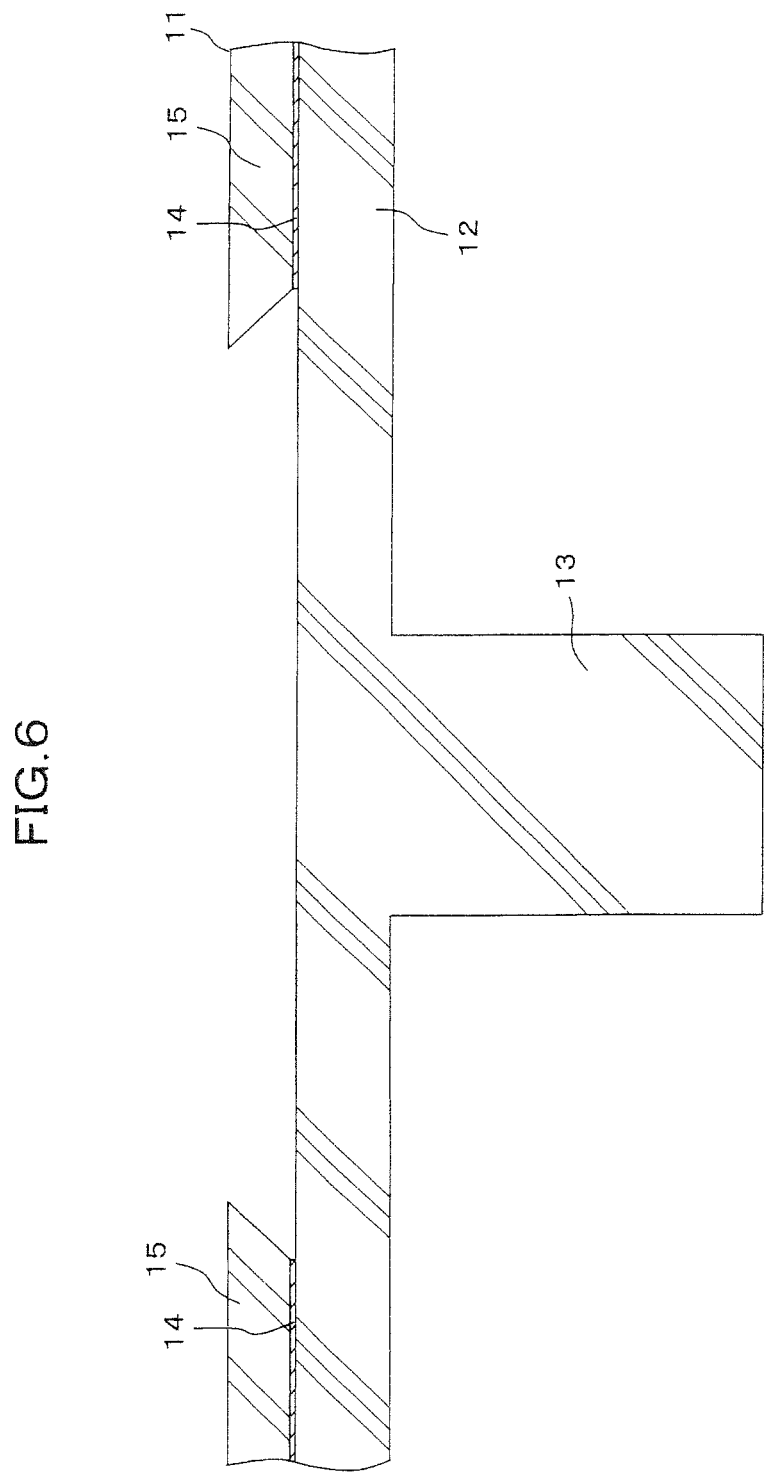
FIG. 6 is a diagram showing one example of a construction process of a mounting base of FIG. 1.
Figure 7:
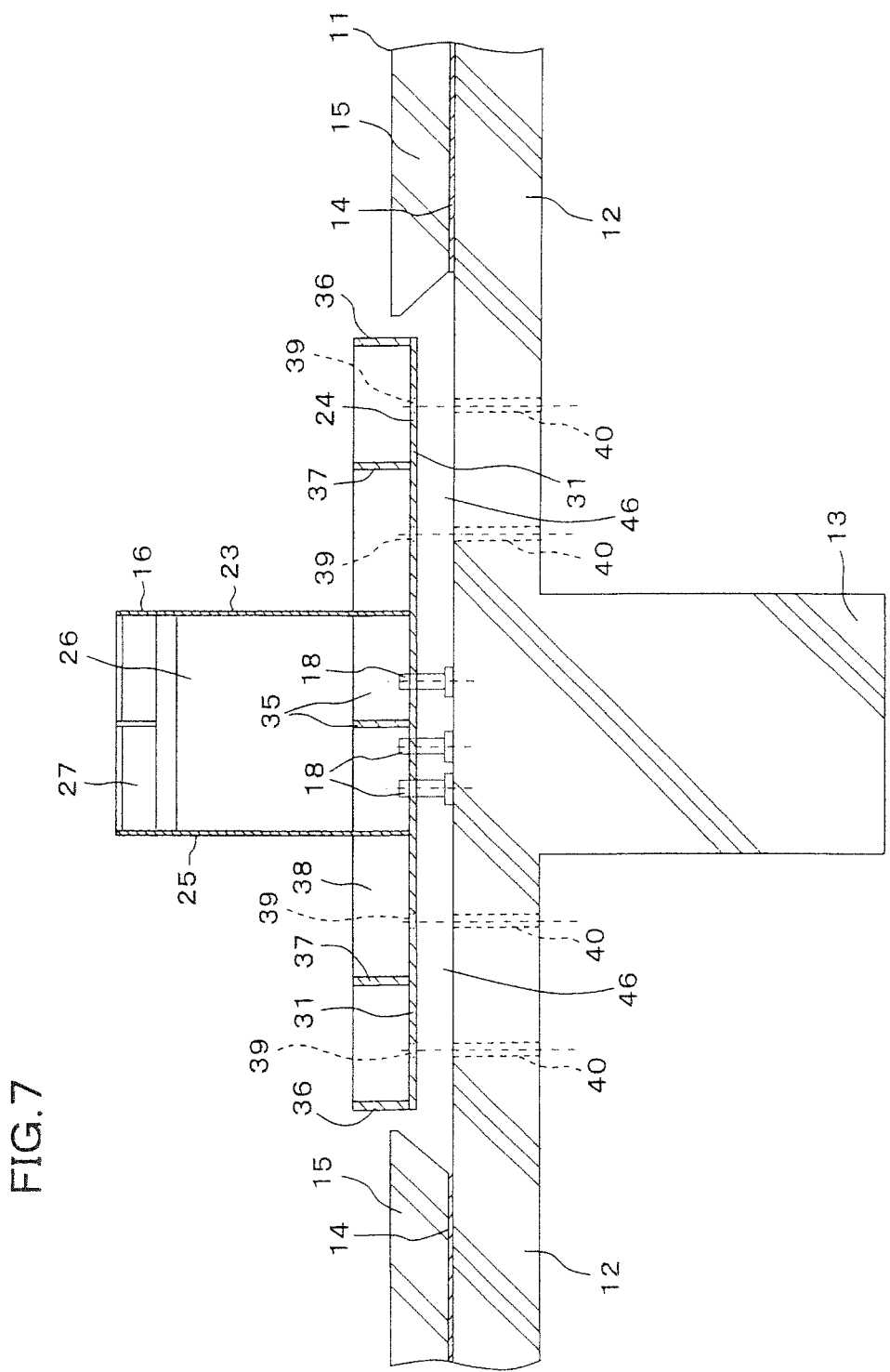
FIG. 7 is a diagram showing a construction process of a mounting base following FIG. 6.
Figure 8:
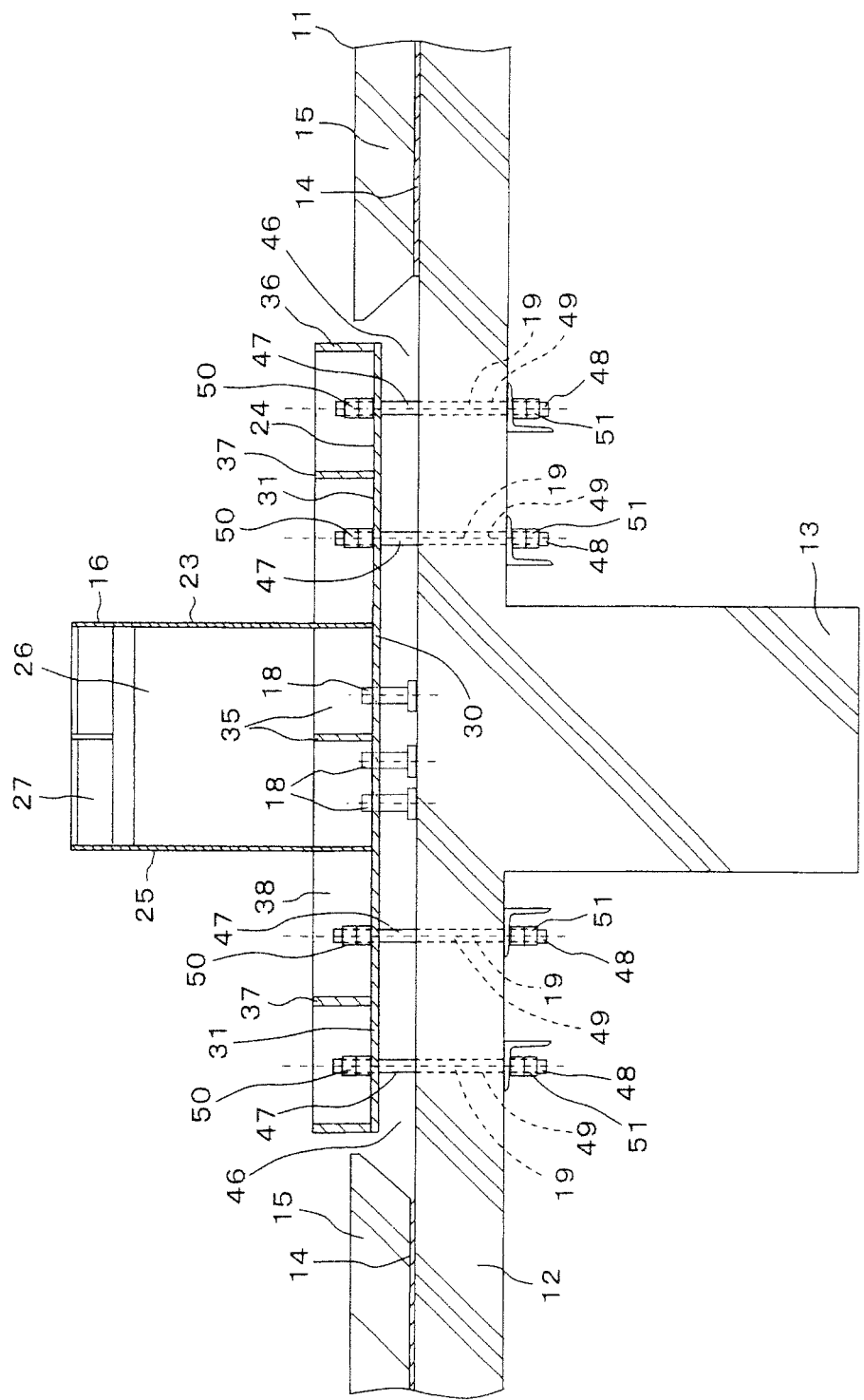
FIG. 8 is a diagram showing a construction process of a mounting base following FIG. 7.
Figure 9:
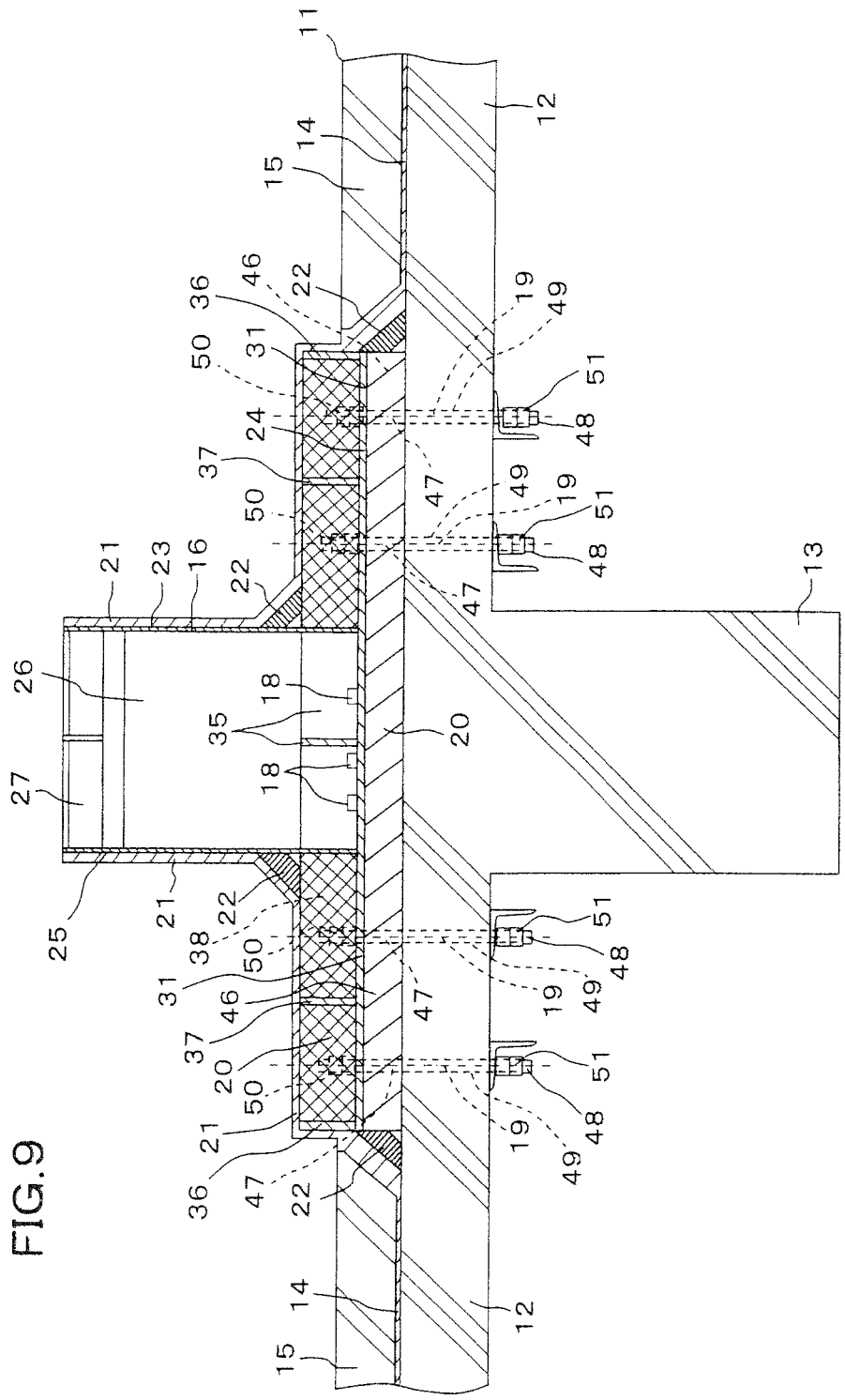
FIG. 9 is a diagram showing a construction process of a mounting base following FIG. 8.

FIG. 6 is a diagram showing one example of a construction process of a mounting base 10A, and FIG. 7 is a diagram showing a construction process of a mounting base 10A following FIG. 6. FIG. 8 is a diagram showing a construction process of a mounting base 10A following FIG. 7, and FIG. 9 is a diagram showing a construction process of a mounting base 10A following FIG. 8. FIGS. 6 to 9 show a concrete structure 11 as a section, and each component of the base 10A (not all components) as a section. A construction process of the base 10A will be described as follows with reference to FIGS. 6 to 9 in cases where the mounting base 10A is installed on a rooftop of the concrete structure 11.

Each general-purpose base component produced at a base part manufacturing plant (a metal foundation 16 (foundation), a metal cover 17 (cover), height-adjusting bolts 18, support bolts 19 (anchor bolt), a waterproof layer 21 and a molding material 22 (frame material)) is carried from the plant to a construction site. Upon shipping from the base part manufacturing plant, support bolt insertion holes 39 (bolt hole) are not provided at a second portion 31 of a metal plate 24, and the support bolt insertion holes 39 are bored at the second portion 31 at the construction site. A plurality of adjusting bolt screwing holes 32 are provided beforehand at the first portion 30 of the metal plate 24 at the base part manufacturing plant, and the height-adjusting bolts 18 are screwed into the bolt screwing holes 32.

The rooftop concrete structure 11 is, as shown in FIG. 6, formed from a concrete slab 12, a concrete beam 13, a waterproof layer 14 provided on the concrete slab 12 and the beam 13 and a covering concrete 15 provided on the waterproof layer 14. First, the mounting position of the base 10A on the rooftop concrete structure 11 is determined and marked, and as shown in FIG. 6, the covering concrete 15 and the waterproof layer 14 are removed from the concrete structure 11 at the mounting position to expose the concrete slab 12 and the beam 13.

The concrete structure 11 shown in the figure is formed from the concrete slab 12, the concrete beam 13, the waterproof layer 14 and the covering concrete 15, but it is not limited to the one shown and the mounting base 10A can be constructed on all concrete structures of other configurations currently used. For instance, when a concrete structure is formed from a resin coating film by further applying a synthetic resin on a concrete slab and a concrete beam, the resin coating film, a covering concrete and a waterproof layer are removed from the concrete structure at a base mounting position to expose the concrete slab and the beam.

After exposing the concrete slab 12 and the concrete beam 13 from the concrete structure 11, the position of reinforcing bars installed inside the concrete slab 12 and the beam 13 is measured using a sensor. Subsequently, since the support bolts 19 are installed so that they doesn't contact with the reinforcing bars, the boring position off the reinforcing bars of the support bolt insertion holes 39 (bolt hole) is marked at the second portion 31 of the metal plate 24. With reference to marked positions, the support bolt insertion hole 39 are bored at the boring position of the second portion 31 of the metal plate 24 using a drill (insertion hole boring process). After the bolt insertion holes 39 are bored, as shown in FIG. 7, with reference to marked base mounting positions on the concrete slab 12 and the beam 13, the metal foundation 16 is temporarily installed at the mounting positions (foundation temporarily installing process).

In the foundation temporarily installing process, when the metal foundation 16 is temporarily installed, the metal tube 23 and the first portion 30 of the metal plate 24 are positioned just above the concrete beam 13, and the second portion 31 of the metal plate 24 is positioned just above the concrete slab 12 to make a bolt head 45 of the height-adjusting bolts 18 abut against a top surface of the concrete beam 13. When the metal foundation 16 is temporarily installed at the mounting position, the foundation 16 stands by itself on a top surface of the concrete slab 12 and the beam 13 by being supported by the height-adjusting bolts 18 that abut against a top surface of the concrete beam 13.

After the metal foundation 16 is temporarily installed, screwing positions of the height-adjusting bolts 18 relative to the first portion 30 of the metal plate 24 of the foundation 16 are adjusted and the installation height of the foundation 16 from a top surface of the concrete slab 12 and the concrete beam 13 (height dimension) (height dimension of a space 46) is adjusted (installation height adjusting process). In the installation height adjusting process, as shown in the description of the height-adjusting bolts 18, as the adjusting bolts 18 are rotated clockwise or counterclockwise in the adjusting bolt screwing holes 32, the dimension spaced away from a top surface of the concrete slab 12 and the concrete beam 13 of the metal foundation 16 is adjusted.

In the mounting base 10A, the height dimension of the metal foundation 16 can be changed during construction of the base 10A using the height-adjusting bolts 18, and a requirement for changing the height dimension of the base 10A can be promptly met. In the mounting base 10A, when a plurality of mounting bases are installed, the height dimension of the bases 10A can be readily adjusted and evenly determined.

After adjusting the height dimension of the metal foundation 16, boring positions of support bolt insertion holes 40 (bolt hole) of the concrete slab 12 are marked with reference to positions of the support bolt insertion holes 39 of metal plate 24. Subsequently, after the metal foundation 16 is temporarily retreated from the temporarily installed position (mounting position), the support bolt insertion holes 40 are bored at boring positions marked with a drill (insertion hole boring process). After providing the support bolt insertion holes 40 on the concrete slab 12, the metal foundation 16 is temporarily installed at the mounting position again, and as shown in FIG. 8, the support bolts 19 are inserted into the support bolt insertion holes 39 provided at the second portion 31 of the metal plate 24 and the support bolts 19 are inserted into the support bolt insertion holes 40 provided on the concrete slab 12.

As the support bolts 19 are inserted into the support bolt insertion holes 39, 40, free end portions 47 upwardly extend from a top surface of the concrete slab 12 and fixed end portions 48 downwardly extend from an undersurface of the concrete slab 12, and an intermediate portion 49 is positioned in the support bolt insertion holes 40 of the concrete slab 12. Subsequently, hexagonal double nuts 50 are screwed into a portion of the free end portions 47 of the support bolts 19 that upwardly extends from the metal plate 24 and hexagonal double nuts 51 are screwed into the fixed end portions 48 of the support bolts 19, and the support bolts 19 are fixed to the metal plate 24 and the concrete slab 12 (support bolt fixing process).

After the support bolts 19 are fixed to the metal plate 24 and the concrete slab 12, and as shown in FIG. 9, a mortar 29 (cement cured object) is filled into a space 38 surrounded by the second portion 31 of the metal plate 24 and the first side plates 36 to cure a mortar 20. To save a curing period of the mortar 20, a metal top plate (not shown) is disposed on a top surface of the second portion 31 of the metal plate 24 instead of the mortar 20 to block an opening of the space 38 with its top plate (space closing process). In this case, the mortar 20 is not filled into the space 38 and the top plate is welded to an upper end edge of first and second side plates 36, 37 to be jointed (fused together).

After the mortar 20 is cured or the opening of the space 38 is blocked with the top plate, the trigonal prism-shaped molding material 22 is provided at an intersecting portion of the metal tube 23 and the metal plate 24, and the molding material 22 is secured to the metal tube 23 and the metal plate 24 with an adhesive agent (not shown). In addition, trigonal prism-shaped molding materials 22 are installed on the covering concrete 15 and the concrete slab 12, and the molding material 22 is secured to the covering concrete 15 and the concrete slab 12 with an adhesive agent (not shown) (frame material installing process). When the molding material 22 is installed at an intersecting portion of the metal tube 23 and the metal plate 24, the molding material 22 surrounds the whole outer circumferential edge of the metal tube 23. When the molding material 22 is installed on the covering concrete 15 and the concrete slab 12, the molding material 22 surrounds the whole outer circumferential edge of the metal plate 24, and the molding material 22 blocks a gap between the concrete slab 12 and an outer circumferential edge of the metal plate 24.

After the molding material 22 is installed, the waterproof layer 21 is installed outside each side plate 25 of the metal tube 23 and outside the metal plate 24 (on a top surface of the mortar 20 filled into the space 38 or a top surface of the top plate blocking the space 38) (waterproof layer installing process). In the waterproof layer installing process, a plurality of thin asphalt sheets are secured outside each side plate 25 of the metal tube 23, outside the metal plate 24 and outside the molding material 22 to provide the waterproof layer 21, and the waterproof layer 21 that extends from the molding material 22 is connected to the waterproof layer 14 of the concrete structure 11. Even if the mounting base 10A is installed outside the concrete structure 11, the waterproof layer 21 can prevent water leakage inside the metal foundation 16 and prevent the foundation 16 from corroding and decreasing the strength. Also, the waterproof layer 21 can prevent water leakage inside the concrete structure 11 and degradation of the structure 11 therefrom.

After the waterproof layer 21 is installed, the mortar 20 (cement cured object) is filled into a space 46 formed between a top surface of the concrete slab 12 and the concrete beam 13 and an undersurface of the metal plate 24 (cement cured object filling process). In the cement cured object filling process, the state of the mortar 20 filled into the space 46 is confirmed from a confirmation hole 34 to fill the mortar 20 into the space 46 from the fill hole 33.

In the mounting base 10A, since the mortar 20 can be filled into the space 46 using the fill hole 33 after fixing the support bolts 19 to the metal plate 24 and the concrete slab 12, the mortar 20 can be assuredly filled into the space 46. In the mounting base 10A, the state of the mortar 20 filled into the space 46 is confirmed using a confirmation hole 34 to fill the mortar 20 into the space 46 completely evenly.

Just after filling the mortar 20 into the space 46, the metal cover 17 is immediately fitted into a top of the metal tube 23 to block an opening 27 of the metal tube 23 prior to completion of a curing period of the mortar 20. After the metal cover 17 is fitted into the top of the metal tube 23, cover fixing bolts 28 are screwed into fixing bolt screwing holes 29 provided at an upper portion of each side plate 25 of the metal tube 23 and bolts 29 are inserted into cover fixing bolt insertion holes of the angle bar 41 of the metal cover 17, and the bolts 29 are screwed into hexagonal nuts 43 provided in bolt insertion holes to fix the cover 17 to a top of the metal tube 25 (top closing process) (FIG. 3 assisted). An opening 27 of the metal tube 25 is blocked by the metal cover 17 in a watertight manner.

In fact, since the gap (a circumferential edge of the space 46) is blocked by the molding material 22, the molding material 22 serves as a bank that prevents the leakage of a pre-cured mortar 20, and the mortar 20 filled into the space 46 shows no leakage from the gap (the space 46), and the opening 27 can be blocked by the metal cover 17 just after filling the mortar 20. In the mounting base 10A, the mortar 20 filled into the space 46 just after fitting the metal cover 17 into a top of the metal tube 25 (or fixing) is pre-cured and a curing period of the mortar 20 starts after the cover 17 is fixed to the top of the tube 25.

In the space 46, the mortar 20 filled therein is cured after completion of a curing period of the mortar 20, a portion of the free end portions 47 of the support bolts 19 that extends between a top surface of the concrete beam 13 (concrete skeleton 13) and the metal plate 24 of the metal tube 25 (a portion of the free end portions 47 of the support bolts 19 that is downwardly exposed from an undersurface of the metal plate 24) is integrated with the mortar 20 to form a reinforced mortar.

After each of the above processes is completed, the mounting base 10A shown in FIGS. 1 to 3 is completed. In the mounting base 10A, the opening 27 of the metal tube 23 can be immediately blocked by the metal cover 17 to complete the base 10A after filling the mortar 20 into the space 46 and prior to completion of a curing period of the mortar 20, thereby shortening construction time corresponding to the curing period of the mortar 20 filled into the space 46 and constructing a plurality of bases 10A prior to completion of the curing period.

In the mounting base 10A, the base 10A can be constructed only by fixing a plurality of support bolts 19 to the second portion 31 of the metal plate 24 of a light metal foundation 16 and the concrete slab 12, filling the mortar 20 into the space 46 and fixing the metal cover 17 to a top of the metal tube 23. All of these general-purpose components are assembled in unit construction system, thereby saving work, cost and time required for producing a framework and curing a mortar, simplifying construction work and significantly shortening construction time required therefor.

In the mounting base 10A, even if the mounting position is on the concrete slab 12 or the beam 13 having a waterproof layer provided with a waterproof function on a rooftop and underground part of an existing concrete structure 11, the base 10A is installed on the concrete slab 12 and the beam 13 exposed after removing the waterproof layer 14 at the mounting position, and the waterproof layer near the mounting position can be repaired (a new waterproof layer 21 can be provided) just after installing the base 10A, thereby promptly installing the base 10A and significantly reducing time required for installing the base 10A.

In the mounting base 10A, the free end portions 47 of the support bolts 19 are fixed to the second portion 31 of the metal plate 24 and the fixed end portions 48 of the support bolts 19 are fixed to the concrete slab 12, thereby firmly installing the base 10A to the concrete structure 11 and firmly installing a solar panel, an antenna, a water tank, a septic tank, and a mechanical appliance such as an air-conditioning apparatus, a structure such as a steel tower and a steel building thereon. In the mounting base 10A, the mortar 20 is filled into the space 46 between a top surface of the concrete slab 12 and the concrete beam 13 and an undersurface of the metal plate 24, and the load on the base 10A with a machine and equipment and a structure thereon is borne by the support bolts 19 and the mortar 20 so that the base doesn't incline or collapse in an undesired manner by the load of the base 10A to assuredly support the machine and equipment and the structure.

Figure 10:
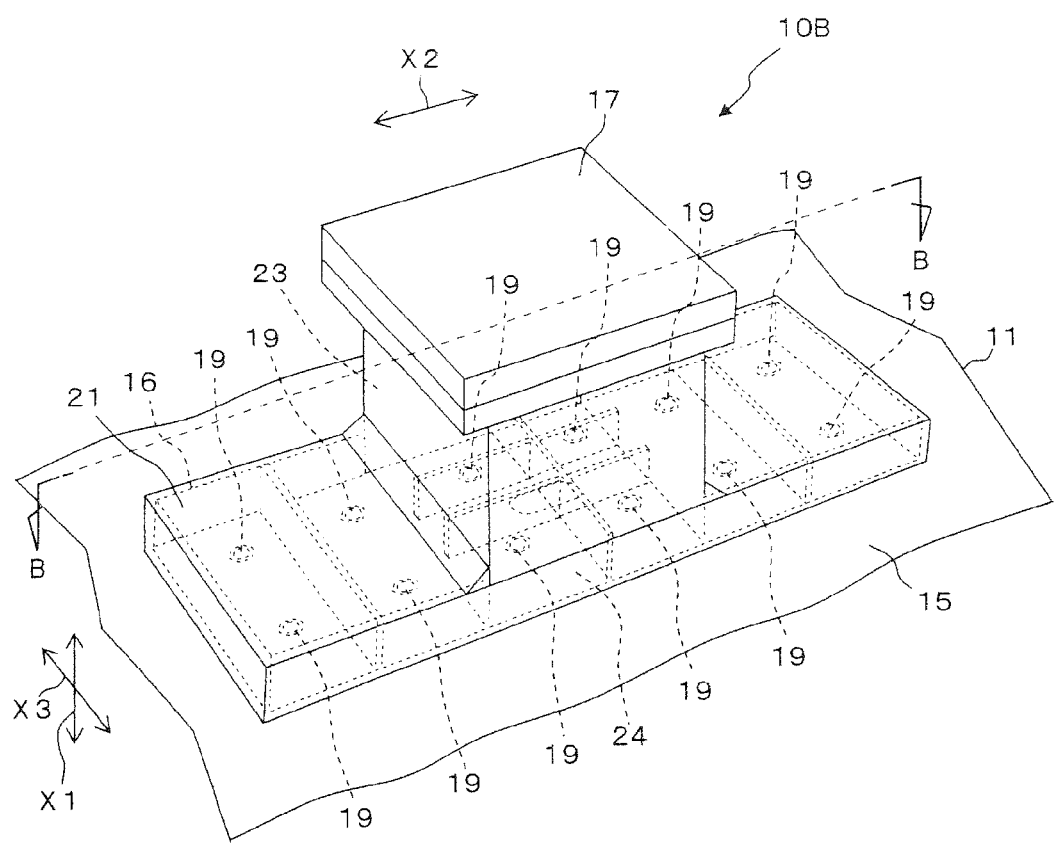
FIG. 10 is a perspective view of a mounting base showing another example.
Figure 11:
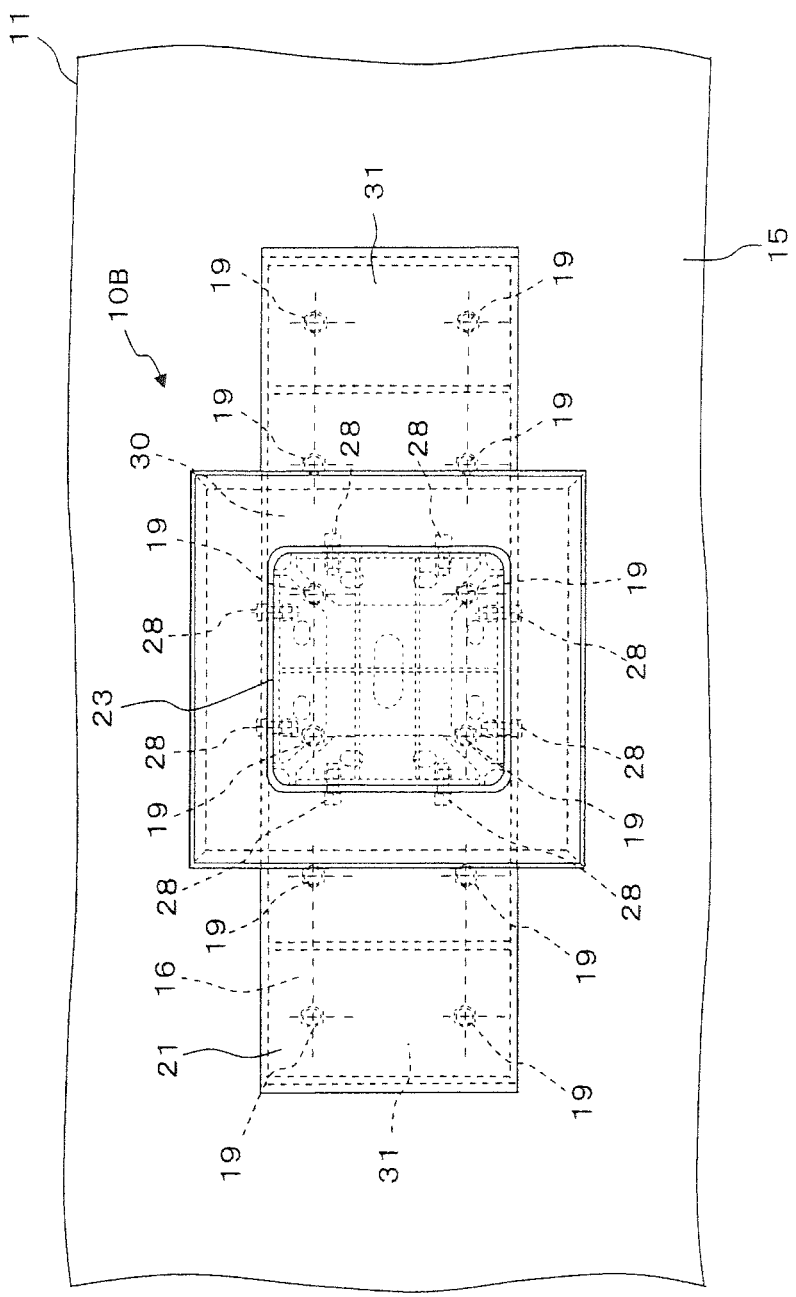
FIG. 11 is a diagram showing a top surface of a mounting base.
Figure 12:
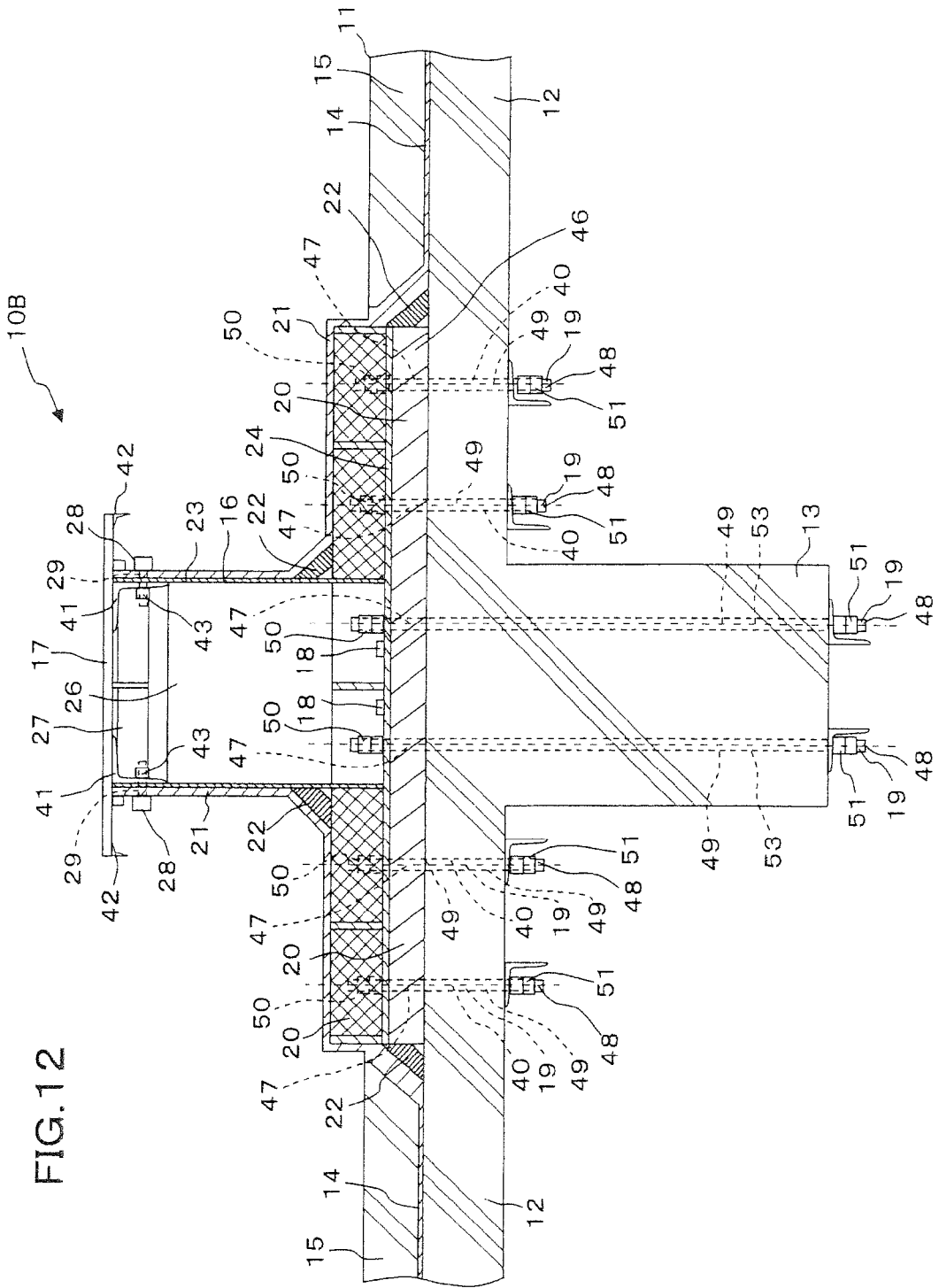
FIG. 12 is a sectional view taken from line B-B of FIG. 10.
Figure 13:
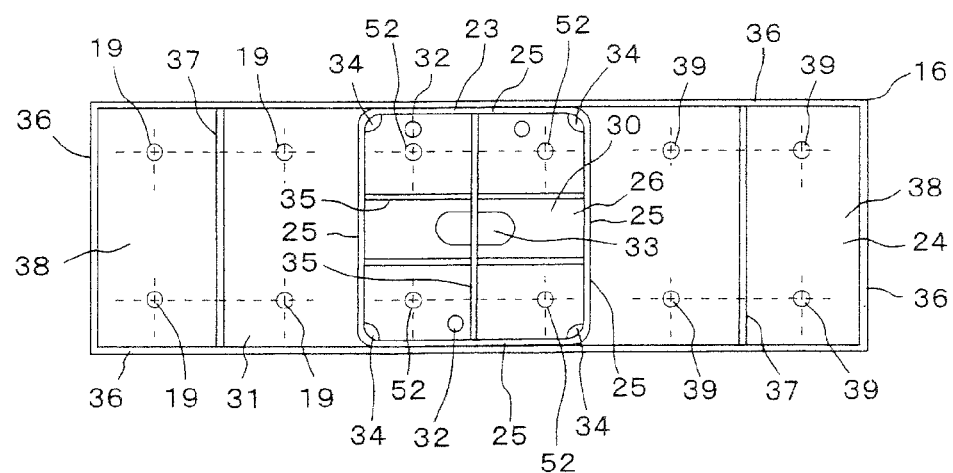
FIG. 13 is a diagram showing a top surface of a metal foundation.
Figure 14:
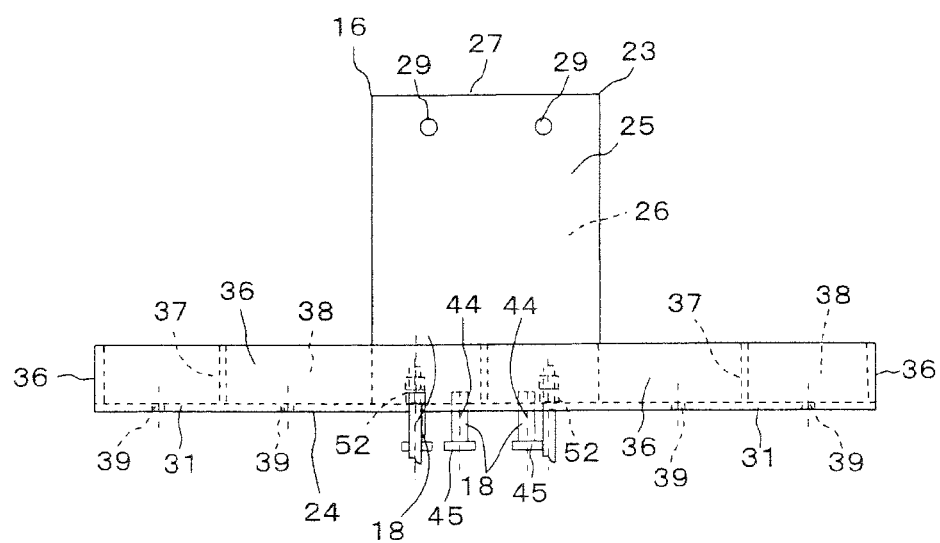
FIG. 14 is a side view of a metal foundation.

FIG. 10 is a perspective view of a mounting base 10B showing another example, and FIG. 11 is a diagram showing a top surface of a mounting base 10B. FIG. 12 is a sectional view taken from line B-B of FIG. 10 and FIG. 13 is a diagram showing a top surface of a metal foundation 16. FIG. 14 is a side view of a metal foundation 16. In FIG. 10, arrow X1 represents a vertical direction, arrow X2 a lateral direction and arrow X3 a longitudinal direction.

The mounting base 10B is different from the one shown in FIG. 1 in that a first portion 30 of a metal plate 24 and a concrete beam 13 are formed from a plurality of support bolt insertion holes 52, 53 that insert support bolts 19 (anchor bolt), the support bolts 19 are inserted into the support bolt insertion holes 52, 53, and the support bolts 19 inserted into the support bolt insertion holes 52, 53 are fixed to the first portion 30 of the metal plate 24 and the concrete beam 13 with hexagonal double nuts 50, 51 (fixing means). Other configurations of the base 10B are the same as those of the base 10A shown in FIG. 1. Therefore, as to the components of the base 10B that are numbered the same as those of the base 10A shown in FIG. 1, with reference to FIG. 1 showing the base 10A, the detailed explanations are not repeatedly provided.

The mounting base 10B, like the one shown in FIG. 1, is installed on a concrete slab 12 and the concrete beam 13 obtained by removing a covering concrete 15 and a waterproof layer 14 from a concrete structure 11. The mounting base 10B is formed from each of general-purpose (standardized) base components: a metal foundation 16 (foundation), a metal cover 17 (cover), a plurality of height-adjusting bolts 18, a plurality of support bolts 19, a mortar 20, a waterproof layer 21 and a molding material 22 (frame material) assembled in a specific manner.

The metal foundation 16 is disposed on the concrete slab 12 and the concrete beam 13 obtained by removing the covering concrete 15 and the waterproof layer 14 from the concrete structure 11. The metal foundation 16 is formed from a metal tube 23 and the metal plate 24. The metal tube 23 (including a first portion 30 of the metal plate 24) is disposed just above the concrete beam 13 and a second portion 31 of the metal plate 24 is disposed just above the concrete slab 12. The metal tube 23 is the same as the one of the base 10A shown in FIG. 1. The metal foundation 16 is lighter than a reinforced concrete base, because a concrete portion is saved. Thus, the weight of the base 10B can be significantly reduced using the metal foundation 16.

The metal plate 24 has a first portion 30 that internally extends in a radial direction from a lower end edge of the metal tube 23 and a second portion 31 that externally extends in a radial direction from a lower end edge of the metal tube 23. The first portion 30 is provided with a plurality of adjusting bolt screwing holes 32 that screw the height-adjusting bolts 18 (FIG. 13). The first portion 30 is provided with an elliptical fill hole 33 for filling the mortar 20 in the middle and four corners of the first portion 30 are provided with a confirmation hole 34 for confirming the state of the mortar 20 filled (FIG. 13). The first portion 30 is provided with a plurality of reinforcing plates 35 that extend laterally and longitudinally.

The second portion 31 of the metal plate 24 is provided with first side plates 36 that upwardly stand from an end edge along both end edges thereof and first side plates 36 that upwardly stand from a side edge along both side edges thereof. In addition, second side plates 37 positioned between the first side plates 36 that upwardly stand from the second portion 31 are provided. The mortar 20 (cement cured object) is filled into a space 38 surrounded by the second portion 31 of the metal plate 24 and the first side plates 36, and the mortar 20 is cured into the space 38 (FIG. 12). Like the base 10A shown in FIG. 1, a metal top plate is provided on a top surface of the second portion 31 of the metal plate 24, and the top plate may block an opening of the space 38.

The first portion 30 of the metal plate 24 is provided with a plurality of support bolt insertion holes 52 (bolt hole) that insert the support bolts 19. The support bolt insertion holes 52 are provided using a drill, which vertically pass through the first portion 30 of the metal plate 24. The support bolt insertion holes 52 are aligned laterally and longitudinally at the first portion 30 with a predetermined interval. As shown in FIG. 13, 4 support bolt insertion holes 52 are provided, but the number of the insertion holes 52 is not particularly limited, but determined by structural calculation (strength calculation) prior to mounting of the base 10B. The second portion 31 of the metal plate 24A is provided with a plurality of support bolt insertion holes 39 (bolt hole) that insert the support bolts 19. The support bolt insertion holes 39 are aligned laterally and longitudinally at a second portion 31 with a predetermined interval.

The base mounting position of the concrete beam 13 is provided with a plurality of support bolt insertion holes 53 (bolt hole) that insert the support bolts 19. The support bolt insertion holes 53 are provided using a drill, which vertically pass through the beam 13 so that they don't contact with reinforcing bars laid in the concrete beam 13. The support bolt insertion holes 53 are positioned at the support bolt insertion holes 52 formed at the first portion 30 of the metal plate 24 when the metal foundation 16 is placed on a top surface of the concrete slab 12 and the concrete beam 13. The support bolt insertion holes 53 are aligned laterally and longitudinally at the concrete beam 13 with a predetermined interval.

The base mounting position of the concrete slab 12 is provided with a plurality of support bolt insertion holes 40 (bolt hole) that insert the support bolts 19. The support bolt insertion holes 40 are provided using a drill, which vertically pass through the concrete slab 12 so that they don't contact with reinforcing bars laid in the concrete slab 12. The support bolt insertion holes 40 are positioned at the support bolt insertion hole 39 formed at the second portion 31 of the metal plate 24 when the metal foundation 16 is placed on a top surface of the concrete slab 12 and the concrete beam 13.

The metal cover 17 and the height-adjusting bolts 18 are the same as those of the base 10A shown in FIG. 1. The metal cover 17, like the one shown in FIG. 1, is fixed to a top of the metal tube 24 by cover fixing bolts 28 inserted into fixing bolt insertion holes provided at an angle bar 41 and hexagonal nuts 43 attached to the angle bar 41 to block an opening of the metal tube 24 in a watertight manner.

As the height-adjusting bolt 18, like the one shown in FIG. 1, are rotated in the adjusting bolt screwing holes 32, the metal plate 24 of the metal foundation 16 is upwardly spaced away from a top surface of the concrete slab 12 and the concrete beam 13 and a space 46 of a predetermined height dimension is formed between a top surface of the concrete slab 12 and the beam 13 and an undersurface of the metal plate 24. By adjusting the screwing position of the height-adjusting bolts 18 relative to the first portion 30 of the metal plate 24 of the metal foundation 16, the height dimension of the space 46 can be adjusted and the height dimension of the metal foundation 16 from a top surface of the concrete slab 12 and the concrete beam 13 can be adjusted within the length of the bolt 18.

The support bolts 19 are inserted into the support bolt insertion hole 39, 52 provided at the first and second portions 30, 31 of the metal plate 24 and inserted into the support bolt insertion hole 40, 53 provided by the concrete slab 12 and the concrete beam 13. The support bolts 19 have free end portions 47 that upwardly extend from a top surface of the concrete slab 12 and the concrete beam 13, fixed end portions 48 that downwardly extend from an undersurface of the concrete slab 12 and the beam 13 and an intermediate portion 49 positioned at the support bolt insertion holes 40, 53 of the concrete slab 12 and the beam 13 that extends between the ends 47, 48.

The free end portions 47 of the support bolts 19 are inserted into the support bolt insertion hole 39, 52 opening the metal plate 24 and fixed to the metal plate 24 with hexagonal double nuts 50 (fixing means). The fixed end portions 48 of the support bolts 19 are fixed to the concrete slab 12 and the concrete beam 13 with hexagonal double nuts 51 (fixing means). When the hexagonal double nuts 50, 51 are screwed into the ends 47, 48 of the support bolts 19, the height dimension of the metal foundation 16 from a top surface of the concrete slab 12 and the concrete beam 13 is already adjusted by the height-adjusting bolts 18.

The mortar 20 is filled into the space 46 from the fill hole 33 formed on the metal plate 24. The mortar 20 filled into the space 46 is cured, and the mortar 20 is jointed on a top surface of the concrete slab 12 and an undersurface of the first and second portions 30, 31 of the metal plate 24 and jointed on the support bolts 19. In the space 46, a portion of the free end portions 47 of the support bolts 19 that extends between a top surface of the concrete slab 12 and a second portion 31 of the metal plate 24 is integrated with the mortar 20. The cured mortar 20 bears the load on the base 10B with a solar panel, an antenna, a water tank, a septic tank, and a mechanical appliance such as an air-conditioning apparatus, a structure such as a steel tower and a steel building thereon (on the metal cover 17) together with the support bolts 19.

A trigonal prism-shaped molding material 22 (frame material) is provided at an intersecting portion of the metal tube 23 and the metal plate 24. The molding material 22 is secured to the metal tube 23 and the metal plate 24 with an adhesive agent (not shown) to surround the whole outer circumferential edge of the metal tube 23. The covering concrete 15 and the concrete slab 12 are provided with a trigonal prism-shaped molding material 22 (frame material). The molding material 22 is secured to the concrete slab 12 and the covering concrete 15 with an adhesive agent (not shown). A molding material 22 is provided between an outer circumferential edge of the metal foundation 16 (an outer circumferential edge of the metal plate 24) and the concrete slab 12 (a concrete structure) to surround the whole outer circumferential edge of the metal plate 24 and block a gap between the concrete slab 12 and an outer circumferential edge of the metal plate 24.

The waterproof layer 21 is provided outside each side plate 25 of the metal tube 23 to cover the whole side plate 25 and provided outside of the metal plate 24 (a top surface of the mortar 20 filled into the space 38 or a top surface of a top plate blocking the space 38) to cover the whole metal plate 24 and the whole first and second side plates 36, 37. The waterproof layer 21 involves the use of an asphalt waterproof for preparing asphalt sheet layers by laminating a plurality of thin asphalt sheets. The asphalt sheets are secured to a side plate 25 of the metal tube 23, the mortar 20, the first and second side plates 36, 37 and the molding material 22 with each distinct adhesive property. A portion that externally extends from the second portion 31 of the metal plate 24 of the waterproof layer 21 (a asphalt sheet secured to the molding material 22) is connected to the waterproof layer 14 of the concrete structure 11.

Figure 15:
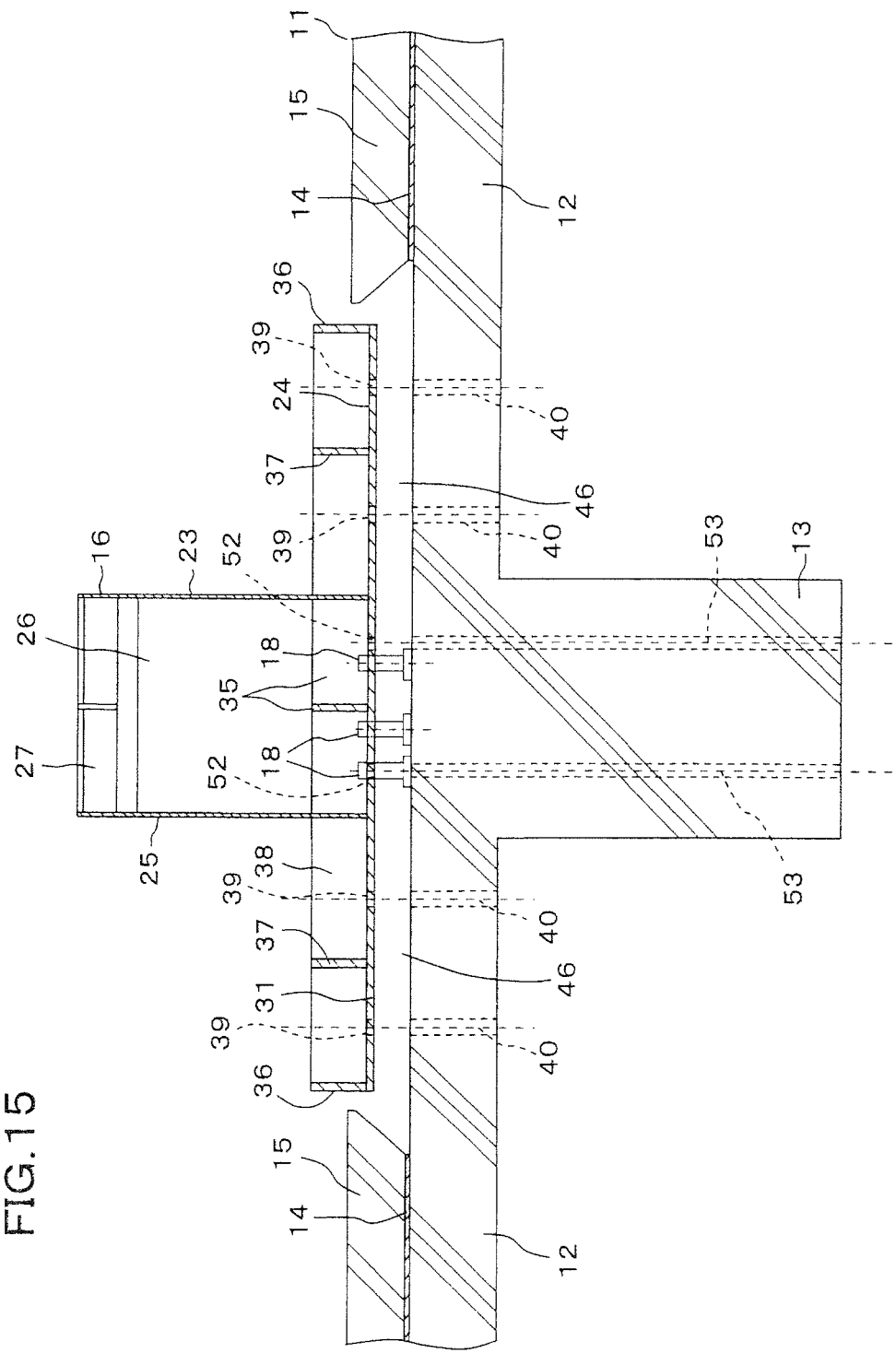
FIG. 15 is a diagram showing one example of a construction process of a mounting base of FIG. 10.
Figure 16:
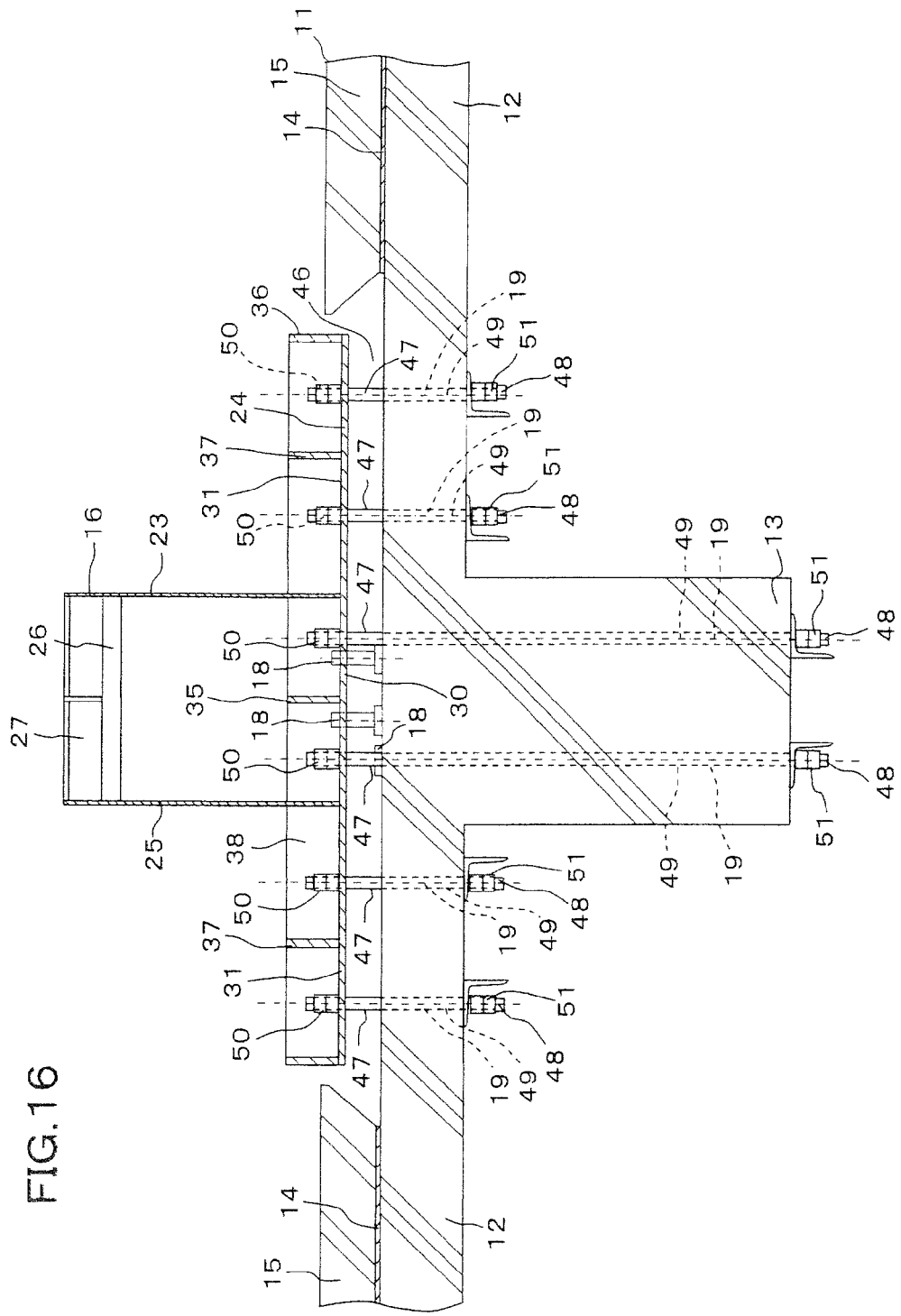
FIG. 16 is a diagram showing a construction process of a mounting base following FIG. 15.
Figure 17:
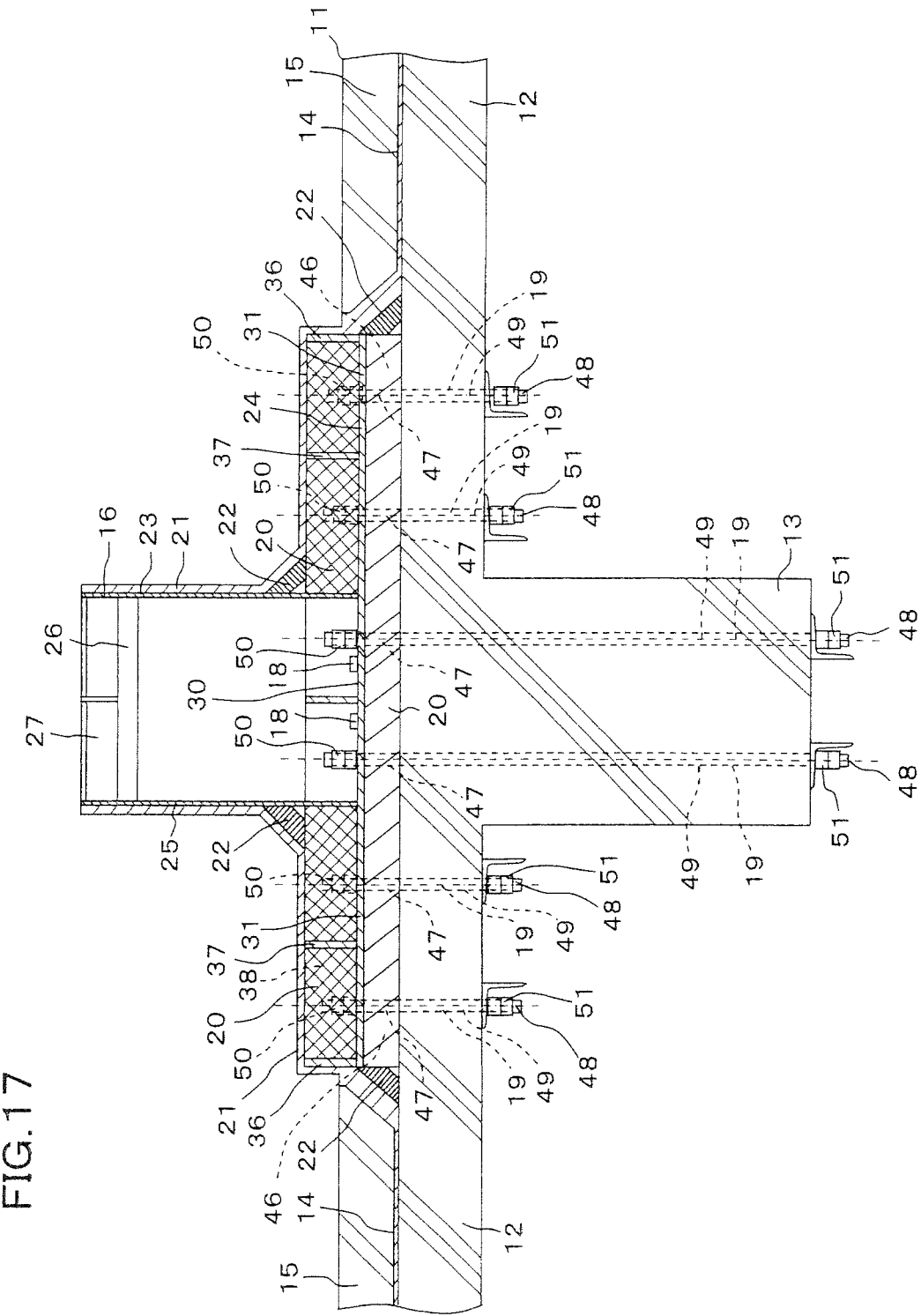
FIG. 17 is a diagram showing a construction process of a mounting base following FIG. 15.

FIG. 15 is a diagram showing one example of a construction process of a mounting base 10B, and FIG. 16 is a diagram showing a construction process of a mounting base 10B following FIG. 15. FIG. 17 is a diagram showing a construction process of a mounting base 10B following FIG. 15. FIGS. 15 to 17 show a concrete structure 11 as a section, and each component of the base 10B (not all components) as a section.

With reference to FIGS. 15 to 17 together with FIG. 6-*assisted* reference, a construction process of the mounting base 10B will be described as an example of mounting a mounting base 10B on a rooftop of the concrete structure 11. Upon shipping from a base part manufacturing plant, first and second portions 30, 31 of the metal plate 24 are not provided with support bolt insertion holes 39, 52 (bolt hole), and the support bolt insertion holes 39, 52 are bored at the first and second portions 30, 31 at a construction site. The first portion 30 of the metal plate 24 is provided with a plurality of adjusting bolt screwing holes 32 at a base part manufacturing plant beforehand, and height-adjusting bolts 18 are screwed into the bolt screwing holes 32.

After each of general-purpose base components produced at the base part manufacturing plant (a metal foundation 16 (foundation), a metal cover 17 (cover), the height-adjusting bolts 18, support bolts 19 (anchor bolt), a waterproof layer 21 and a molding material 22 (frame material)) is carried from the plant to a construction site, the mounting position of the base 10B on a rooftop of the concrete structure 11 is determined and marked. Subsequently, the concrete slab 12 and the beam 13 are exposed by removing the covering concrete 15 and the waterproof layer 14 from the concrete structure 11 at the mounting position (FIG. 6-*assisted*).

After exposing the concrete slab 12 and the concrete beam 13 from the concrete structure 11, the position of reinforcing bars provided inside the concrete slab 12 and the beam 13 is measured using a sensor. Subsequently, to install the support bolts 19 off reinforcing bars, the boring position off the reinforcing bars of the support bolt insertion holes 39, 52 (bolt hole) is marked at the first and second portions 30, 31 of the metal plate 24. With reference to marked positions, the support bolt insertion holes 39, 52 are bored at the boring position of the first and second portions 30, 31 of the metal plate 24 using a drill (insertion hole boring process). After boring the bolt insertion holes 39, 52, as shown in FIG. 15, the metal foundation 16 is temporarily installed at the mounting position with reference to the marked base mounting position on the concrete slab 12 and the beam 13 (foundation temporarily installing process).

In the foundation temporarily installing process, when the metal foundation 16 is temporarily installed, the metal tube 23 and the first portion 30 of the metal plate 24 are positioned just above the concrete beam 13 and the second portion 31 of the metal plate 24 is positioned just above the concrete slab 12 to make bolt heads 45 of the height-adjusting bolts 18 abut against a top surface of the concrete beam 13. When the metal foundation 16 is temporarily installed at the mounting position, the foundation 16 stands by itself on a top surface of the concrete slab 12 and the beam 13 by being supported by the height-adjusting bolts 18 that abut against a top surface of the concrete beam 13.

After temporarily installing the metal foundation 16, the screwing position of the height-adjusting bolts 18 relative to the first portion 30 of the metal plate 24 of the foundation 16 is adjusted and the installation height of the foundation 16 from a top surface of the concrete slab 12 and the concrete beam 13 (height dimension) (height dimension of the space 46) is adjusted (installation height adjusting process). In the mounting base 10B, the height dimension of the metal foundation 16 can be changed during construction of the base 10B using the height-adjusting bolts 18, and a requirement for changing the height dimension of the base 10B can be promptly met. In the mounting base 10B, when a plurality of bases are installed, the height dimension therebetween can be readily adjusted and evenly determined.

After adjusting the height dimension of the metal foundation 16, the boring position of the support bolt insertion holes 40, 53 (bolt hole) of the concrete slab 12 and the concrete beam 13 are marked with reference to the positions of support bolt insertion holes 39, 52 of the metal plate 24. Subsequently, after retreating the metal foundation 16 from the temporarily installing position (mounting position), the support bolt insertion holes 40, 53 are bored at the boring position marked using a drill (insertion hole boring process). After providing the support bolt insertion holes 40, 53 on the concrete slab 12 and the concrete beam 13, the metal foundation 16 is temporarily installed at the mounting position again, and as shown in FIG. 16, the support bolts 19 are inserted into the support bolt insertion holes 39, 52 provided at the first and second portions 30, 31 of the metal plate 24, and the support bolts 19 are inserted into the support bolt insertion holes 40, 53 provided on the concrete slabs 12 and the beam 13.

As the support bolts 19 are inserted into the support bolt insertion holes 39, 40, 52 and 53, free end portions 47 upwardly extend from a top surface of the concrete slab 12 and the concrete beam 13, fixed end portions 48 downwardly extend from an undersurface of the concrete slab 12 and the concrete beam 13, and an intermediate portion 49 is positioned at the support bolt insertion holes 40, 53 of the concrete slab 12 and the concrete beam 13. Subsequently, hexagonal double nuts 50 are screwed into a portion of the free end portions 47 of the support bolt 19 that upwardly extends from the metal plate 24, hexagonal double nuts 51 are screwed into the fixed end portions 48 of the support bolt 19, and the support bolts 19 are fixed to the metal plate 24, the concrete slab 12 and the concrete beam 13 (support bolt fixing process).

After fixing the support bolts 19 to the metal plate 24, the concrete slab 12 and the concrete beam 13, and as shown in FIG. 17, a mortar 29 is filled into a space 38 surrounded by the second portion 31 of the metal plate 24 and first side plates 36 to cure the mortar 20. Like the base 10A shown in FIG. 1, a metal top plate is disposed on a top surface of the second portion 31 of the metal plate 24, instead of filling of the mortar 20, and the top plate may block an opening of the space 38.

After the mortar 20 is cured or the opening of the space 38 is blocked by the top plate, like the base 10A shown in FIG. 1, a trigonal prism-shaped molding material 22 is provided at an intersecting portion of the metal tube 23 and the metal plate 24 and a trigonal prism-shaped molding material 22 is provided on the covering concrete 15 and the concrete slab 12 (frame material installing process). When the molding material 22 is provided at the intersecting portion of the metal tube 23 and the metal plate 24, the molding material 22 surrounds the whole outer circumferential edge of the metal tube 23. When the molding material 22 is provided on the covering concrete 15 and the concrete slab 12, the molding material 22 surrounds the whole outer circumferential edge of the metal plate 24 and the molding material 22 blocks a gap between the concrete slab 12 and an outer circumferential edge of the metal plate 24.

After installing the molding material 22, a waterproof layer 21 is installed outside each side plate 25 of the metal tube 23 and outside the metal plate 24 (top surface of the mortar 20 filled into the space 38 or top surface of top plate blocking the space 38) (waterproof layer installing process). In the waterproof layer installing process, like the base 10A shown in FIG. 1, a plurality of thin asphalt sheets are secured outside each side plate 25 of the metal tube 23, outside the metal plate 24 and outside the molding material 22 to provide the waterproof layer 21, and a waterproof layer 21 extending from the molding material 22 is connected to the waterproof layer 14 of the concrete structure 11. Even if the mounting base 10B is installed outside the concrete structure 11, the waterproof layer 21 can prevent water leakage inside the metal foundation 16 and prevent the foundation 16 from corroding and reducing the strength. Also, the waterproof layer 21 can prevent water leakage inside the concrete structure 11 and prevent degradation of the concrete structure 11 therefrom.

After installing the waterproof layer 21, the mortar 20 is filled into the space 46 (cement cured object filling process). In the cement cured object filling process, the state of the mortar 20 filled into the space 46 can be confirmed by a confirmation hole 34 and the mortar 20 is filled into the space 46 from a fill hole 33. In the mounting base 10B, since the mortar 20 can be filled into the space 46 using the fill hole 33 after fixing the support bolts 19 to the metal plate 24 and the concrete slab 12, the mortar 20 can be assuredly filled into the space 46. In the mounting base 10B, the state of the mortar 20 filled into the space 46 is confirmed using the confirmation hole 34 and the mortar 20 can be filled into the space 46 completely evenly.

The metal cover 17 is immediately fitted into a top of the metal tube 23 to block an opening 27 of the metal tube 23 just after filling the mortar 20 into the space 46 and prior to completion of a curing period of the mortar 20. After fitting the metal cover 17 into a top of the metal tube 23, cover fixing bolts 28 are screwed into fixing bolt screwing holes 29 provided at an upper portion of each side plate 25 of metal tube 23, and the bolts 29 are inserted into cover fixing bolt insertion holes of an angle bar 41 of the metal cover 17 and the bolts 29 are screwed into hexagonal nuts 43 attached to the bolt insertion holes to fix the cover 17 to a top of the metal tube 25 (top closing process) (FIG. 12-*assisted*). The opening 27 of the metal tube 25 is blocked by the metal cover 17 in a watertight manner.

In fact, since the gap (a circumferential edge of the space 46) is blocked by the molding material 22, the molding material 22 serves as a bank that prevents the leakage of a pre-cured mortar 20, and the mortar 20 filled into the space 46 shows no leakage from the gap (the space 46), and the opening 27 can be blocked by the metal cover 17 just after filling the mortar 20. In the mounting base 10B, the mortar 20 filled into the space 46 just after fitting the metal cover 17 into a top of the metal tube 25 (or fixing) is pre-cured and a curing period of the mortar 20 starts after the cover 17 is fixed to the top of the tube 25.

In the space 46, the mortar 20 filled therein is cured after completion of a curing period of the mortar 20, a portion of the free end portions 47 of the support bolts 19 that extends between a top surface of the concrete slab 12 (concrete skeleton 12) and the concrete beam 13 (concrete skeleton 13) and the metal plate 24 of the metal tube 25 (a portion of the free end portions 47 of the support bolts 19 that is downwardly exposed from an undersurface of the metal plate 24) is integrated with the mortar 20 to form a reinforced mortar.

After each of the above processes is completed, the mounting base 10B shown in FIGS. 10 to 12 is completed. In the mounting base 10B, the opening 27 of the metal tube 23 can be immediately blocked by the metal cover 17 to complete the base 10B after filling the mortar 20 into the space 46 and prior to completion of a curing period of the mortar 20, thereby shortening construction time corresponding to the curing period of the mortar 20 filled into the space 46 and constructing a plurality of bases 10B prior to completion of the curing period.

In the mounting base 10B, the base 10B can be constructed only by fixing a plurality of support bolts 19 to the second portion 30 of the metal plate 24 of a light metal foundation 16 and the concrete beam 13, fixing a plurality of support bolts 19 to the second portion 31 of the metal plate 24 and the concrete slab 12, filling the mortar 20 into the space 46 and fixing the metal cover 17 to a top of the metal tube 23. All of these general-purpose components are assembled in unit construction system, thereby saving work, cost and time required for producing a framework and curing a mortar, simplifying construction work and significantly shortening construction time required therefor.

In the mounting base 10B, even if the mounting position is on the concrete slab 12 or the beam 13 having a waterproof layer provided with a waterproof function on a rooftop and underground part of an existing concrete structure 11, the base 10B is installed on the concrete slab 12 and the beam 13 exposed after removing the waterproof layer 14 at the mounting position, and the waterproof layer near the mounting position can be repaired (a new waterproof layer 21 can be provided) just after installing the base 10B, thereby promptly installing the base 10B and significantly reducing time required for installing the base 10B.

In the mounting base 10B, the free end portions 47 of the support bolts 19 are fixed to the first and second portion 30, 31 of the metal plate 24 and the fixed end portions 48 of the support bolts 19 are fixed to the concrete slab 12 and the concrete beam 13, thereby firmly installing the base 10B to the concrete structure 11 and firmly installing a solar panel, an antenna, a water tank, aseptic tank, and a mechanical appliance such as an air-conditioning apparatus, a structure such as a steel tower and a steel building thereon.

In the mounting base 10B, the mortar 20 is filled into the space 46 between a top surface of the concrete slab 12 and the concrete beam 13 and an undersurface of the metal plate 24, and the load on the base 10B with a machine and equipment and a structure thereon is borne by the support bolts 19 and the mortar 20 so that the base doesn't incline or collapse in an undesired manner by the load of the base 10B to assuredly support the machine and equipment and the structure.

Figure 18:
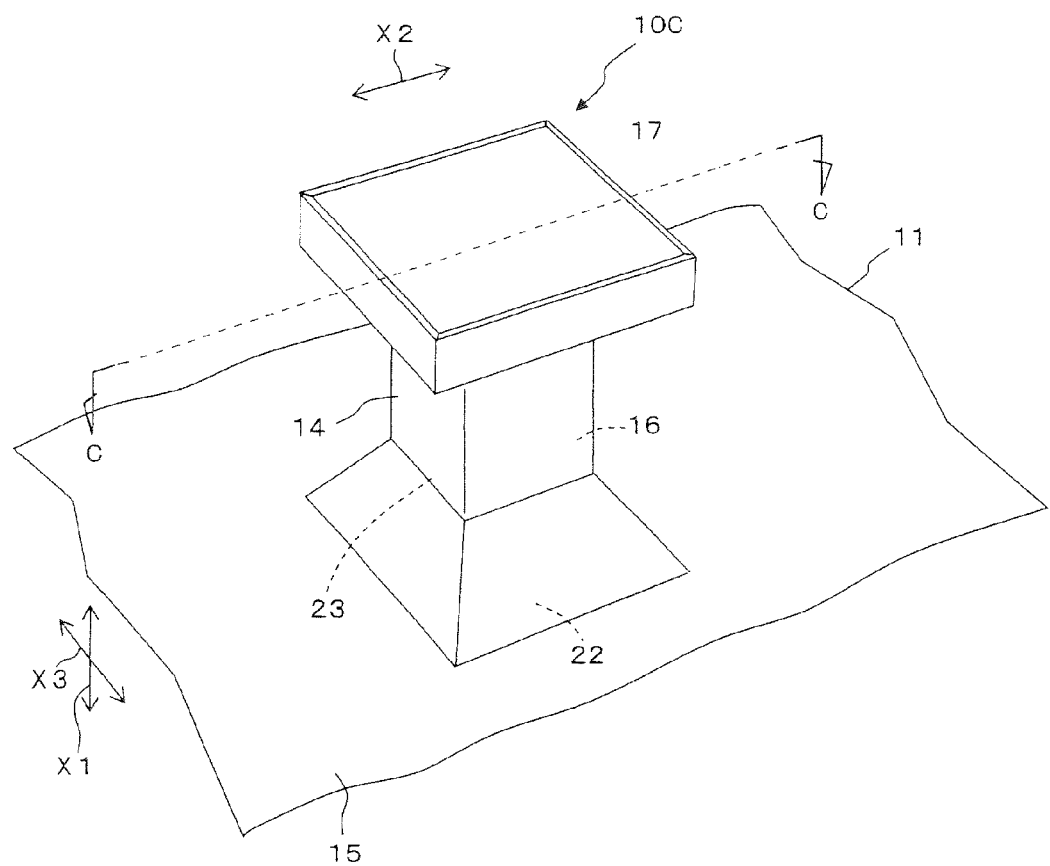
FIG. 18 is a perspective view of a mounting base showing another example.
Figure 19:
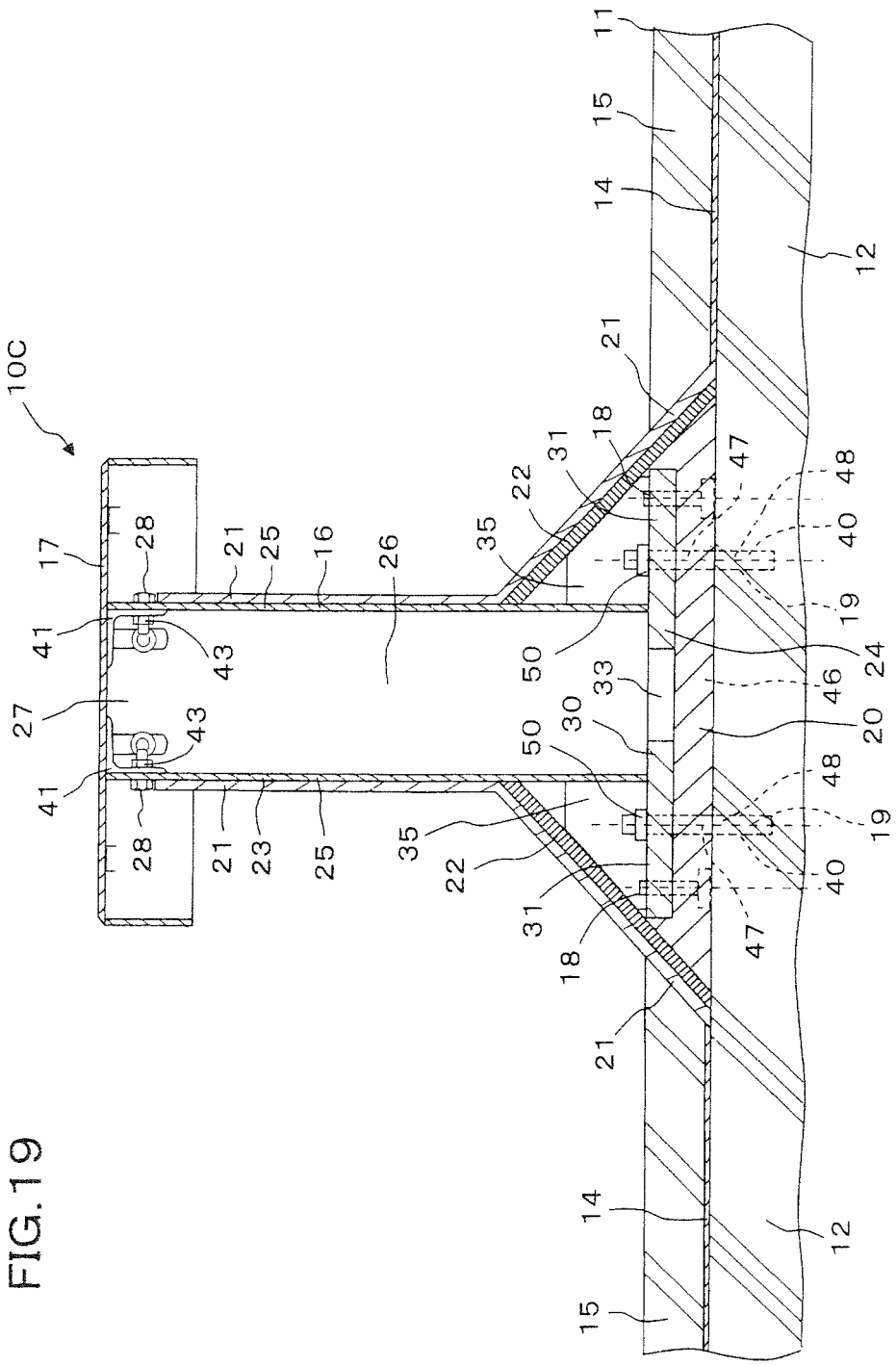
FIG. 19 is a sectional view taken from line A-A of FIG. 1.
Figure 20:
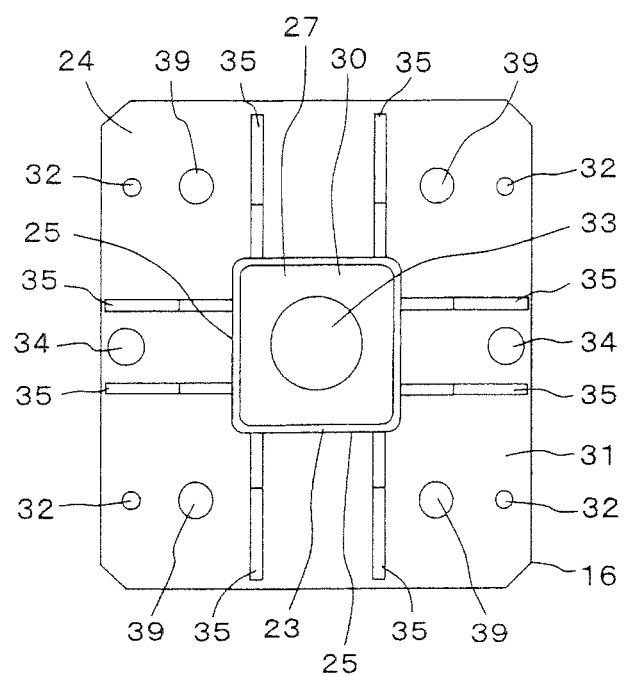
FIG. 20 is a diagram showing a top surface of a metal foundation.
Figure 21:
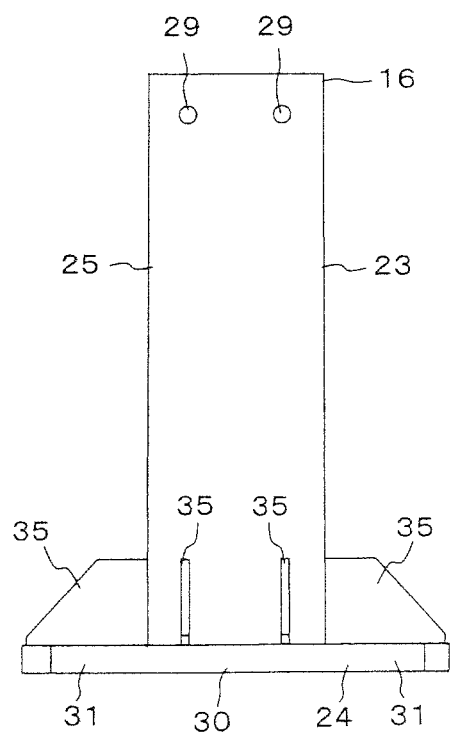
FIG. 21 is a side view of a metal foundation.

FIG. 18 is a perspective view of a mounting base 10C showing another example, FIG. 19 is a sectional view taken from line C-C of FIG. 18, and FIG. 20 is a diagram showing a top surface of a metal foundation 16. FIG. 21 is a side view of a metal foundation 16. In FIG. 18, arrow X1 represents a vertical direction, arrow X2 a lateral direction and arrow X3 a longitudinal direction. The concrete structure 11 is formed from a concrete skeleton 12 (including a concrete slab and a concrete beam), a waterproof layer 14 provided on the concrete skeleton 12 and a concrete layer 15 provided on the waterproof layer 14. The concrete skeleton 12 is provided with a plurality of reinforcing bars (not shown) laid therein.

The mounting base 10C is installed on a concrete slab 12 obtained by removing a covering concrete 15 and a waterproof layer 14 from a concrete structure 11. The mounting base 10C is formed from each of general-purpose (standardized) base components: a metal foundation 16 (foundation), a metal cover 17 (cover), a plurality of height-adjusting bolts 18, a plurality of support bolts 19 (anchor bolt), a mortar 20 (cement cured object), a waterproof layer 21 and a molding material 22 (frame material) assembled in a specific manner.

The metal foundation 16 is a standardized general-purpose product of the same shape and dimension, and after a plurality thereof are produced at a base part manufacturing plant other than a construction site, they are carried to the construction site. The metal foundation 16 is disposed on the concrete skeleton 12 obtained by removing the covering concrete 15 and the waterproof layer 14 from the concrete structure 11. The metal foundation 16 is formed from a hollow tubular metal tube 23 (tubing material) and a metal plate 24 (bottom plate) having an approximately rectangular planar shape. The metal foundation 16 is produced by welding the metal tube 23 to a top surface of the metal plate 24. The metal tube 23 and the metal plate 24 are made of a metal such as iron, aluminum and alloy. The metal foundation 16 is lighter than a reinforced concrete base, because a concrete portion is saved. Thus, the weight of the base 10C can be significantly reduced using the metal foundation 16.

The metal tube 23 has each side plate 25 in an approximately rectangular shape, and a section thereof is formed in an approximately quadrangular shape. The metal tube 23 is disposed on a top surface in the middle of the metal plate 24, and a lower end edge thereof is welded to the top surface of the metal plate 24 to be jointed (fused together). In the metal tube 23, a hollow space 26 is partitioned by the side walls 25, and a top of the metal tube 23 is formed from an opening 27 surrounded by upper end edges of the side plates 25. The top of the metal tube 23 is provided with a plurality of fixing bolt screwing holes 29 that screw cover fixing bolts 28. The fixing bolt screwing holes 29 are provided with female screws (not shown) screwed by the cover fixing bolts 28.

The metal plate 24 has a first portion 30 that internally extends in a radial direction from a lower end edge of the metal tube 23 and a second portion 31 that externally extends in a radial direction from a lower end edge of the metal tube 23. The second portion 30 is provided with a plurality of adjusting bolt screwing holes 32 that screw the height-adjusting bolts 18 (FIG. 20). The adjusting bolt screwing holes 32 are provided with female screws (not shown) screwed by the height-adjusting bolts 18. The number and boring position of the bolt screwing holes 32 at the second portion 31 are not particularly limited, and the bolt screwing holes 32 can be provided at any position of the second portion 31. The first portion 30 of the metal plate 24 is provided with an elliptical fill hole 33 for filling the mortar 20 in the middle. The second portion 31 is provided with a confirmation hole 34 for confirming the state of the mortar 20 filled (FIG. 20).

The second portion 31 of the metal plate 24 has both end edges (circumferential edge) that laterally extend and both side edges (circumferential edge) that longitudinally extend. The metal tube 23 and the second portion 31 of the metal plate 24 are provided with a plurality of reinforcing plate 35 that vertically extend. The reinforcing plates 35 are welded to an outer surface of the metal tube 23 and a top surface of the metal plate 24 to be jointed (fused together). The reinforcing plates 35 serve as a reinforcing material that increases the strength of the metal tube 23 and the metal plate 24.

The second portion 31 of the metal plates 24 is provided with a plurality of support bolt insertion holes 39 (bolt hole) that screw the support bolts 19. The support bolt insertion holes 39 are provided using a drill, which vertically pass through the second portion 31 of the metal plate 24. The support bolt insertion holes 39 are aligned laterally and longitudinally at the second portion 31 with a predetermined interval. As shown in FIG. 20, 4 support bolt insertion holes 39 are provided, but the number of the insertion holes 39 is not particularly limited, but determined by structural calculation (strength calculation) prior to mounting of the base 10C.

The base mounting position of the concrete skeleton 12 is provided with a plurality of support bolt insertion holes 40 (bolt hole) that insert the support bolts 19. The support bolt insertion holes 40 are provided using a drill, which vertically extend at the concrete skeleton 12 so that they don't contact with reinforcing bars laid in the concrete skeleton 12. The support bolt insertion holes 40 are positioned at the support bolt insertion holes 39 formed at the second portion 31 of the metal plate 24 when the metal foundation 16 is placed on a top surface of the concrete skeleton 12. The support bolt insertion holes 40 are aligned laterally and longitudinally at the concrete skeleton 12 with a predetermined interval.

The metal cover 17 is a standardized general-purpose product of the same shape and dimension, and is made of a metal such as iron, aluminum and alloy, and a planar shape thereof is formed in an approximately rectangular shape. On an undersurface of the metal cover 17 or inside a circumferential edge of the cover 17 is an angle bar 41 (steel material) for fixing the cover 17 to a top of the metal tube 23 welded to be jointed (fused together). On an undersurface of the metal cover 17 and a circumferential edge of the cover 17 is a drain angle bar 42 (steel material) welded to be jointed (fused together). The angle bar 41 is provided with fixing bolt insertion holes (not shown) that insert cover fixing bolts 28, and hexagonal nuts 43 are welded to the fixing bolt insertion holes to be jointed (fused together).

The metal cover 17 is fixed to a top of the metal tube 24 by the cover fixing bolts 28 inserted into fixing bolt insertion holes provided at the angle bar 41 and the hexagonal nuts 43 attached to the angle bar 41 to block the opening 27 of the metal tube 24 in a watertight manner. The top surface of the metal cover 17 is provided with a fixed apparatus for installing a solar panel, an antenna, a water tank, a septic tank, and a mechanical appliance such as an air-conditioning apparatus, a structure such as a steel tower and a steel building (not shown).

The height-adjusting bolts 18 are hexagon head bolts formed from a threaded shaft 44 having a male screw provided and a bolt head 45. The threaded shaft 44 of the height-adjusting bolts 18 is screwed beforehand into the adjusting bolt screwing holes 32 provided at the second portion 31 of the metal plate 24. In the bolt head 45, as the height-adjusting bolts 18 are rotated counterclockwise, the threaded shaft 44 of the bolts 18 slowly advances toward the bolt screwing holes 32 downward and extends from an undersurface of the second portion 31 downward to make the bolt head 45 abut against a top surface of the concrete beam 13. Accordingly, the metal foundation 16 can be spaced away from a top surface of the concrete slab 12 and the concrete beam 13 upwardly with a predetermined dimension. Conversely, as the height-adjusting bolts 18 are rotated clockwise, the threaded shaft 44 of the bolts 18 slowly advances toward the bolt screwing holes 32 upwardly and upwardly extends from an undersurface of the second portion 31. Accordingly, the metal foundation 16 can be closer to a top surface of the concrete skeleton 12.

As the height-adjusting bolts 18 are rotated in the adjusting bolt screwing holes 32, the metal plate 24 of the metal foundation 16 is upwardly spaced away from a top surface of the concrete skeleton 12, and a space 46 is formed with a predetermined height dimension between a top surface of the concrete skeleton 12 and an undersurface of the metal plate 24. By adjusting the screwing position of the height-adjusting bolts 18 relative to the second portion 31 of the metal plate 24 of the metal foundation 16, the height dimension of the space 46 can be adjusted and the height dimension of the metal foundation 16 from a top surface of the concrete skeleton 12 can be adjusted within the length of the bolt 18.

The support bolts 19 are standardized general-purpose products of the same length and diameter, and made of a steel material, and are inserted into the support bolt insertion hole 39 provided at the second portion 31 of the metal plate 24 and inserted into the support bolt insertion holes 40 provided on the concrete skeleton 12. The support bolts 19 have free end portions 47 that upwardly extend from a top surface of the concrete skeleton 12 and fixed end portions 48 fixed to the concrete skeleton 12.

The free end portions 47 of the support bolts 19 are inserted into the support bolt insertion holes 39 opening the metal plate 24 and fixed to the metal plate 24 with hexagonal nuts 50 (fixing means). The hexagonal nuts 50 are attached to a portion of the free end portions 47 that upwardly extends from the metal plate 24. The fixed end portion 48 of the support bolts 19 are fixed to the insertion holes 40 with a resin adhesive agent (fixing means) (not shown) injected into the support bolt insertion holes 40 of the concrete skeleton 12. When the hexagonal nuts 50 are screwed into the free end portions 47 of the support bolts 19, the height dimension of the metal foundation 16 from a top surface of the concrete skeleton 12 is already adjusted by the height-adjusting bolts 18.

The mortar 20 is filled into a space 46 formed between a top surface of the concrete skeleton 12 and an undersurface of the metal plate 24. The mortar 20 is filled from the fill hole 33 formed on the metal plate 24. The mortar 20 filled into the space 46 is cured and the mortar 20 is jointed to atop surface of the concrete skeleton 12 and an undersurface of the first and second portions 30, 31 of the metal plate 24 and jointed to the support bolts 19.

In the space 46, a portion of the free end portions 47 of the support bolts 19 that extends between a top surface of the concrete skeleton 12 and the second portion 31 of the metal plate 24 is integrated with the mortar 20. The cured mortar 20 bears the load on the base 10C (on the metal cover 17) with a solar panel, an antenna, a water tank, a septic tank, and a mechanical appliance such as an air-conditioning apparatus, a structure such as a steel tower and a steel building thereon together with the support bolts 19.

The metal tube 23, the metal plate 24, the covering concrete 15 and the concrete slab 12 are provided with the molding material 22 (frame material). The molding material 22 is secured to the metal tube 23, the concrete slab 12 and the covering concrete 15 with an adhesive agent (not shown). The molding material 22 surrounds the whole outer circumferential edge of the metal tube 23 and is positioned between an outer circumferential edge of the metal foundation 16 (outer circumferential edge of the metal plate 24) and concrete slab 12 (concrete structure) to surround the whole outer circumferential edge of the metal plate 24. The molding material 22 blocks a gap between the concrete slab 12 and an outer circumferential edge of the metal plate 24.

The waterproof layer 21 is provided outside each side plate 25 of the metal tube 23 to cover the whole side plate 25, and provided outside the metal plate 24 to cover the whole metal plate 24. The waterproof layer 21 is employed as an asphalt waterproof that forms asphalt sheet layers by laminating a plurality of thin asphalt sheets. The asphalt sheets are secured to the side plate 25 of the metal tube 23, the mortar 20 and the molding material 22 with each distinct adhesive property. A portion that externally extends from the second portion 31 of the metal plate 24 of the waterproof layer 21 (an asphalt sheet secured to the molding material 22) is connected to the waterproof layer 14 of the concrete structure 11.

Figure 22:
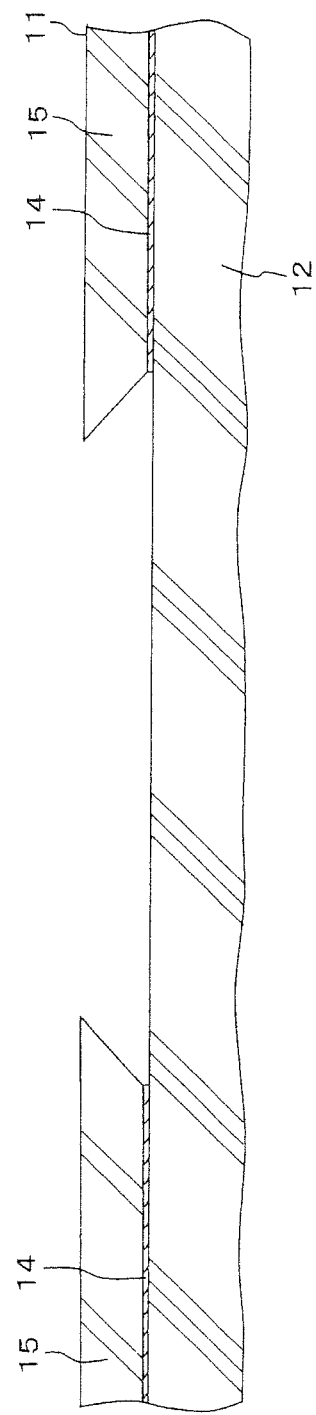
FIG. 22 is a diagram showing one example of a construction process of a mounting base of FIG. 18.
Figure 23:
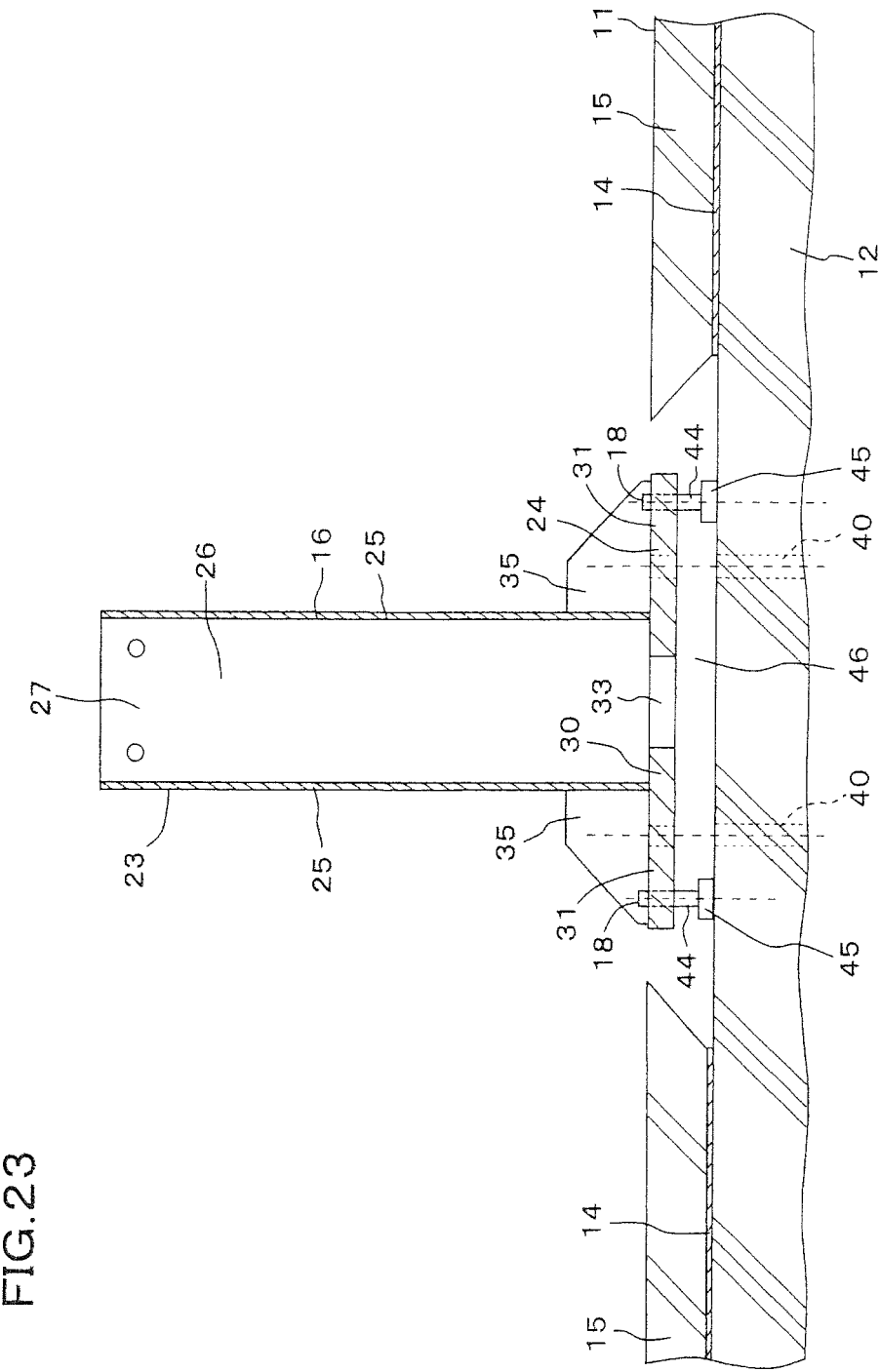
FIG. 23 is a diagram showing a construction process of a mounting base following FIG. 22.
Figure 24:
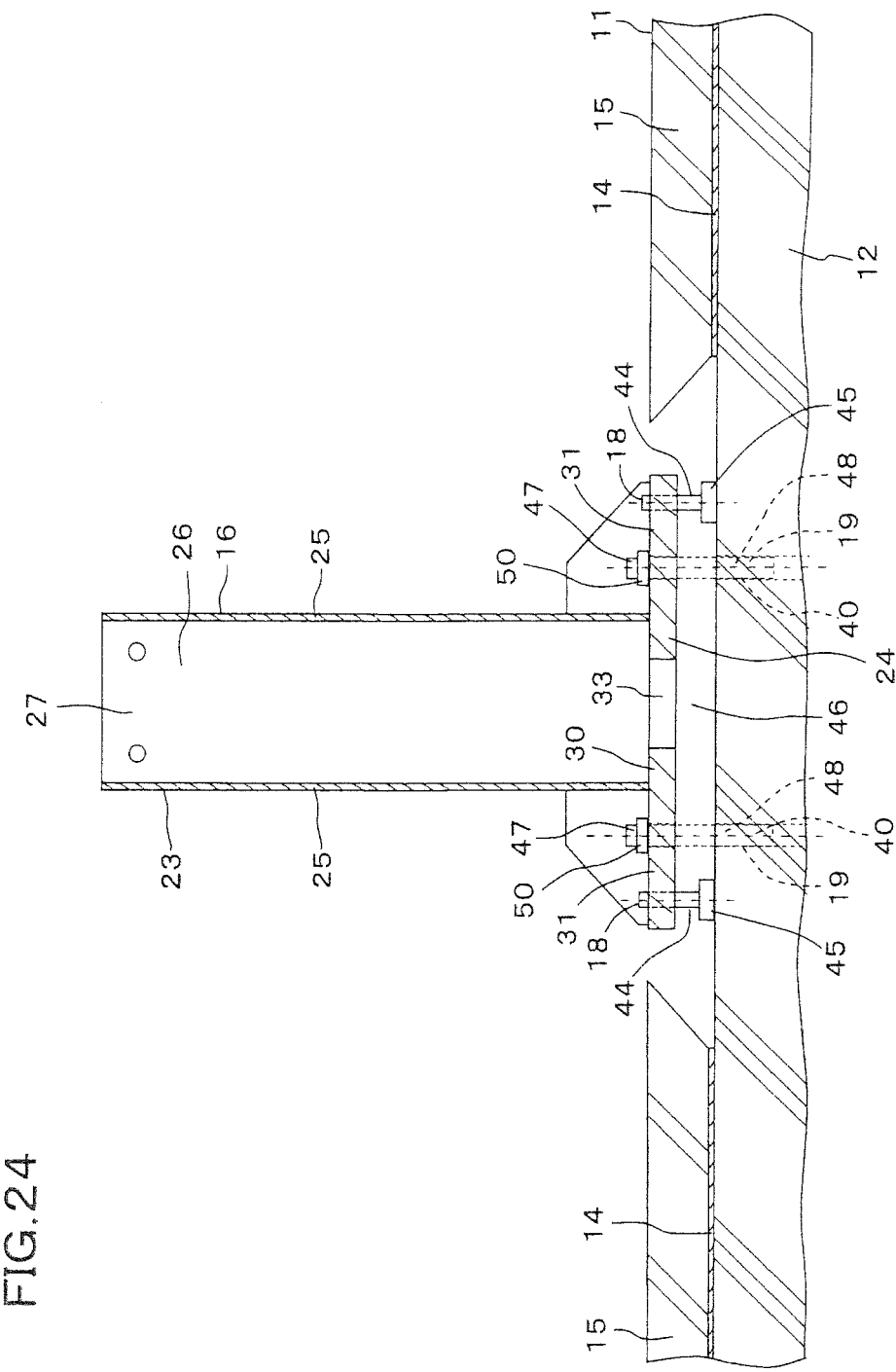
FIG. 24 is a diagram showing a construction process of a mounting base following FIG. 23.

FIG. 22 is a diagram showing one example of a construction process of a mounting base 10C, and FIG. 23 is a diagram showing a construction process of a mounting base 10C following FIG. 22. FIG. 24 is a diagram showing a construction process of a mounting base 10C following FIG. 23 and FIG. 25 is a diagram showing a construction process of a mounting base 10C following FIG. 24. FIGS. 22 to 25 show a concrete structure 11 as a section, and each component of the base 10C (not all components) as a section. A construction process of the base 10C will be described as follows with reference to FIGS. 22 to 25 in cases where the mounting base 10C is installed on a rooftop of the concrete structure 11.

Upon shipping from a base part manufacturing plant, support bolt insertion holes 39 (bolt hole) are not provided at a second portion 31 of a metal plate 24, and support bolt insertion holes 39 are bored at the second portion 31 at the construction site. A plurality of adjusting bolt screwing holes 32 are provided beforehand at the second portion 31 of the metal plate 24 at the base part manufacturing plant, and the height-adjusting bolts 18 are screwed into the bolt screwing hole 32.

After each general-purpose base component produced at a base part manufacturing plant (a metal foundation 16 (foundation), a metal cover 17 (cover), height-adjusting bolts 18, support bolts 19 (anchor bolt), a waterproof layer 21 and a molding material 22 (frame material)) is carried from the plant to a construction site, the mounting position of the base 10C on a rooftop of the concrete structure 11 is determined and marked. Subsequently, the concrete skeleton 12 is exposed by removing the covering concrete 15 and the waterproof layer 14 from the concrete structure 11 at the mounting position.

After exposing the concrete skeleton 12 from the concrete structure 11, the position of reinforcing bars installed inside the concrete skeleton 12 is measured using a sensor. Subsequently, since the support bolts 19 are installed so that they don't contact with the reinforcing bars, the boring position off the reinforcing bars of the support bolt insertion holes 39 (bolt hole) is marked at the second portion 31 of the metal plate 24. With reference to marked positions, the support bolt insertion holes 39 are bored at the boring position of the second portion 31 of the metal plate 24 using a drill (insertion hole boring process). After the bolt insertion holes 39 are bored, as shown in FIG. 23, with reference to marked base mounting positions on the concrete skeleton 12, the metal foundation 16 is temporarily installed at the mounting positions (foundation temporarily installing process).

In the foundation temporarily installing process, when the metal foundation 16 is temporarily installed, the metal tube 23 and the first and second portions 30, 31 of the metal plate 24 are positioned on the concrete skeleton 12 to make a bolt head 45 of the height-adjusting bolts 18 abut against a top surface of the concrete skeleton 12. When the metal foundation 16 is temporarily installed at the mounting position, the foundation 16 stands by itself on a top surface of the concrete skeleton 12 by being supported by the height-adjusting bolts 18 that abut against a top surface of the concrete skeleton 12.

After the metal foundation 16 is temporarily installed, screwing positions of the height-adjusting bolts 18 relative to the second portion 31 of the metal plate 24 of the foundation 16 are adjusted and the installation height of the foundation 16 from a top surface of the concrete skeleton 12 (height dimension) (height dimension of the space 46) is adjusted (installation height adjusting process). In the mounting base 10C, the height dimension of the metal foundation 16 can be changed during construction of the base 10C using the height-adjusting bolts 18, and a requirement for changing the height dimension of the base 10C can be promptly met. In the mounting base 10C, when a plurality thereof are installed, the height dimension of the bases 10C can be readily adjusted and evenly determined.

After adjusting the height dimension of the metal foundation 16, boring positions of support bolt insertion holes 40 (bolt hole) of the concrete skeleton 12 are marked with reference to positions of the support bolt insertion holes 39 of the metal plate 24. Subsequently, after the metal foundation 16 is temporarily retreating from the temporarily installed position (mounting position), the support bolt insertion holes 40 are bored at boring positions marked with a drill (insertion hole boring process). After providing the support bolt insertion holes 40 on the concrete skeleton 12, the metal foundation 16 is temporarily installed at the mounting position again, and as shown in FIG. 24, the support bolts 19 are inserted into the support bolt insertion holes 39 provided at the second portion 31 of the metal plate 24 and the support bolts 19 are inserted into the support bolt insertion holes 40 provided on the concrete skeleton 12.

As the support bolts 19 are inserted into the support bolt insertion holes 39, 40, free end portions 47 upwardly extend from a top surface of the concrete skeleton 12 and fixed end portions 48 are positioned in the support bolt insertion holes 40 of the concrete skeleton 12. A resin adhesive agent (fixing means) (not shown) is injected into the support bolt insertion holes 40, and the fixed end portions 48 of the support bolts 19 are fixed to the insertion holes 40 with the resin adhesive agent. Subsequently, hexagonal nuts 50 are screwed into a portion of the free end portions 47 of the support bolt 19 that upwardly extends from the metal plate 24, and the support bolts 19 are fixed to the metal plate 24 and the concrete skeleton 12 (support bolt fixing process).

After the support bolts 19 are fixed to the metal plate 24 and the concrete skeleton 12, and as shown in FIG. 25, the molding material 22 (frame material) is installed on the metal tube 23, the metal plate 24, the covering concrete 15 and the concrete slab 12 (frame material installing process). When the molding material 22 is installed, the molding material 22 surrounds the whole outer circumferential edge of the metal tube 23 and surrounds the whole outer circumferential edge of the metal plate 24 to block a gap between the concrete slab 12 and an outer circumferential edge of the metal plate 24.

After the molding material 22 is installed, the waterproof layer 21 is installed outside each side plate 25 of the metal tube 23 and outside of the metal plate 24 (outside the molding material 22) (waterproof layer installing process). In the waterproof layer installing process, like the base 10A shown in FIG. 1, a plurality of thin asphalt sheets are secured outside each side plate 25 of the metal tube 23 and outside the molding material 22 to provide the waterproof layer 21, and the waterproof layer 21 that extends from the molding material 22 is connected to the waterproof layer 14 of the concrete structure 11. Even if the mounting base 10C is installed outside the concrete structure 11, the waterproof layer can prevent water leakage inside the metal foundation 16 and prevent the foundation 16 from corroding or decreasing the strength. Also, the waterproof layer 21 can prevent water leakage inside the concrete structure 11 and degradation of the concrete structure 11 therefrom.

After the waterproof layer 21 is installed, the mortar 20 is filled into the space 46 (cement cured object filling process). In the cement cured object filling process, the state of the mortar 20 filled into the space 46 is confirmed from a confirmation hole 34 to fill the mortar 20 into the space 46 from a fill hole 33. In the mounting base 10C, the mortar 20 can be filled into the space 46 using the fill hole 33 after fixing the support bolts 19 to the metal plate 24 and the concrete skeleton 12, the mortar can be assuredly filled into the space 46. In the mounting base 10C, the state of the mortar 20 filled into the space 46 is confirmed using a confirmation hole 34 to fill the mortar 20 into the space 46 completely evenly.

Just after filling the mortar 20 into the space 46, the metal cover 17 is immediately fitted into the top of a metal tube 23 to block an opening 27 of the metal tube 23 prior to completion of a curing period of the mortar 20. After the metal cover 17 is fitted into the top of the metal tube 23, cover fixing bolts 28 are screwed into fixing bolt screwing holes 29 provided at an upper portion of each side plate 25 of the metal tube 23 and bolts 29 are inserted into cover fixing bolt insertion holes of the angle bar 41 of the metal cover 17, and the bolts 29 are screwed into hexagonal nuts 43 provided in bolt insertion holes to fix the cover 17 to a top of the metal tube 25 (top closing process) (FIG. 19). An opening 27 of the metal tube 25 is blocked by the metal cover 17 in a watertight manner.

In fact, since the gap (a circumferential edge of the space 46) is blocked by the molding material 22, the molding material 22 serves as a bank that prevents the leakage of a pre-cured mortar 20, and the mortar 20 filled into the space 46 shows no leakage from the gap (the space 46), and the opening can be blocked by the metal cover 17 just after filling the mortar 20. In the mounting base 10C, the mortar 20 filled into the space 46 just after fitting the metal cover 17 into a top of the metal tube 25 (or fixing) is pre-cured and a curing period of the mortar 20 starts after the cover 17 is fixed to the top of the tube 25.

In the space 46, the mortar 20 filled therein is cured after completion of a curing period of the mortar 20, a portion of the free end portions 47 of the support bolts 19 that extend between a top surface of the concrete skeleton 12 and the metal plate 24 of the metal tube 25 (a portion of the free end portion 47 of the bolt 19 that is downwardly exposed from an undersurface of the metal plate 24) is integrated with the mortar 20 to form a reinforced mortar.

After each of the above processes is completed, the mounting base 10C shown in FIGS. 18 and 19 is completed. In the mounting base 10C, the opening 27 of the metal tube 23 can be immediately blocked by the metal cover 17 to complete the base 10C after filling the mortar 20 into the space 46 and prior to completion of a curing period of the mortar 20, thereby shortening construction time corresponding to the curing period of the mortar 20 filled into the space 46 and constructing a plurality of bases 10C prior to completion of the curing period.

In the mounting base 10C, the base 10C can be constructed only by fixing a plurality of support bolts 19 to the second portion 31 of the metal plate 24 of a light metal foundation 16 and the concrete skeleton 12, filling the mortar 20 into the space 46 and fixing the metal cover 17 to a top of the metal tube 23. All of these general-purpose components are assembled in unit construction system, thereby saving work and time required for producing a formwork and curing a mortar, simplifying construction work and significantly shortening construction time required therefor.

In the mounting base 10C, even if the mounting position is on the concrete skeleton 12 having a waterproof layer provided with a waterproof function on a rooftop and underground part of an existing concrete structure 11, the base 10C is installed on the concrete skeleton 12 exposed after removing the waterproof layer 14 at the mounting position, and the waterproof layer near the mounting position can be repaired (a new waterproof layer 21 can be provided) just after installing the base 10C, thereby promptly installing the base 10C and significantly reducing time required for installing the base 10C.

In the mounting base 10C, the free end portions 47 of the support bolts 19 are fixed to the second portion 31 of the metal plate 24 and the fixed end portions 48 of the support bolts 19 are fixed to the concrete skeleton 12, thereby firmly installing the base 10C to the concrete structure 11 and firmly installing a solar panel, an antenna, a water tank, a septic tank, and a mechanical appliance such as an air-conditioning apparatus, a structure such as a steel tower and a steel building thereon.

In the mounting base 10C, the mortar 20 is filled into the space 46 between a top surface of the concrete skeleton 12 and an undersurface of the metal plate 24, and the load on the base 10C with a machine and equipment and a structure thereon is borne by the support bolts 19 and the mortar 20 so that the base doesn't incline or collapse in an undesired manner by the load of the base 10C to assuredly support the machine and equipment and the structure.

Explanation of References
- 10A mounting base
- 10B mounting base
- 10C mounting base
- 11 concrete structure
- 12 concrete slab (concrete skeleton)
- 13 concrete beam (concrete skeleton)
- 14 waterproof layer
- 15 covering concrete
- 16 metal foundation (foundation)
- 17 metal cover (cover)
- 18 height-adjusting bolt
- 19 support bolt
- 20 mortar (cement cured object)
- 21 waterproof layer
- 22 molding material (frame material)
- 23 metal tube (tubing material)
- 24 metal plate (bottom plate)
- 26 hollow space
- 27 opening
- 30 first portion
- 31 second portion
- 33 fill hole
- 34 confirmation hole
- 36 first side plate
- 37 second side plate
- 39 support bolt insertion hole (bolt hole)
- 40 support bolt insertion hole (bolt hole)
- 46 space
- 47 free end portion 48 fixed end portion
50 nuts (fixing means)
51 nuts (fixing means)
52 support bolt insertion hole (bolt hole)
53 support bolt insertion hole (bolt hole)

The invention claimed is:

1. A mounting base that is installed at a predetermined position of a new or existing concrete structure, said mounting base being formed from: a plurality of bolts that are inserted into bolt hole openings in said concrete structure, the bolts having fixed end portions fixed to the concrete structure and free end portions that upwardly extend from the concrete structure; a foundation that is upwardly spaced away from a top surface of said concrete structure at a predetermined interval; a cover that is installed on said foundation; a frame material that is provided between an outer circumferential edge of said foundation and said concrete structure that blocks a gap between the concrete structure and the outer circumferential edge of the foundation; and a cement cured object that is filled into a space surrounded by said concrete structure, said foundation and said frame material, wherein said foundation has a bottom plate facing said concrete structure and a hollow tubing material that upwardly extends from said bottom plate, wherein free end portions of the bolts are inserted into bolt hole openings in said bottom plate and fixed to the bottom plate with a specific fixing means, and fixed end portions of the bolts are fixed to said concrete structure with a specific fixing means, and a portion of the free end portions of the bolts that extends between said concrete structure and said bottom plate is integrated with the cement cured object filled into said space, and said cover blocks an opening at the top of said tubing material, wherein the opening at the top of said tubing material is blocked by said cover just after filling the cement cured object into said space and prior to completion of a curing period of the cement cured object, the curing period of the cement cured object starts after the opening at the top of said tubing material is blocked by said cover, and a portion of the free end portions of said bolts that extends between said concrete structure and said bottom plate is integrated with said cement cured object after completion of said curing period, wherein said bottom plate has a first portion that internally extends in a radial direction of said tubing material and a second portion that externally extends in a radial direction of said tubing material, wherein said bolts are inserted into bolt hole openings in the second portion of said bottom plate and inserted into bolt holes of said concrete structure facing said second portion, and the free end portions of the bolts are fixed to said second portion with said fixing means and the fixed end portions of the bolts are fixed to bolt holes of said concrete structure facing said second portion with said fixing means, and said frame material is provided between the outer circumferential edge of the second portion of said bottom plate and said concrete structure that blocks a gap between the concrete structure and the outer circumferential edge of the second portion, and a portion of the free end portions of the bolts that extends between said concrete structure and the second portion of said bottom plate is integrated with the cement cured object filled into said space.

2. A mounting base and concrete structure assembly comprising the mounting base according to claim 1, and wherein said concrete structure is formed from a concrete skeleton, a waterproof layer provided on said concrete skeleton and a covering concrete provided on said waterproof layer, wherein the fixed end portions of said bolts are fixed to bolt hole openings in said concrete skeleton obtained by removing said covering concrete and said waterproof layer from said concrete structure, and said bottom plate is upwardly spaced away from said concrete skeleton at a predetermined interval.

3. A mounting base and concrete structure assembly comprising the mounting base according to claim 1, and wherein said concrete structure is formed from a concrete slab, a concrete beam, a waterproof layer provided on said concrete slab and said concrete beam and a covering concrete provided on said waterproof layer, wherein said bolts are inserted into the bolt hole openings in the second portion of said bottom plate and inserted into bolt holes opening said concrete slab obtained by removing said covering concrete and said waterproof layer from said concrete structure, and said tubing material and the first portion of said bottom plate are disposed on said concrete beam, the second portion of said bottom plate is disposed on said concrete slab, and said bottom plate is upwardly spaced away from said concrete slab and said concrete beam at a predetermined interval.

4. The assembly according to claim 3, wherein said bolts are inserted into bolt hole openings in the first portion of said bottom plate and inserted into bolt holes of said concrete structure facing said first portion, and the free end portions of the bolts are fixed to said first portion with said fixing means and the fixed end portions of the bolts are fixed to said concrete structure facing said first portion with said fixing means, and a portion of the free end portions of the bolts that extends between said concrete structure and the first portion of said bottom plate is integrated with the cement cured object filled into said space.

5. The assembly according to claim 3, wherein the second portion of said bottom plate is linked to first side plates that upwardly stand from a circumferential edge thereof and second side plates that are positioned between said first side plates that upwardly stand from said second portion, and a space surrounded by the second portion of said bottom plate and said first side plates is partitioned on said foundation and said cement cured object is filled into said space.

6. The assembly according to claim 3, wherein the second portion of said bottom plate is linked to first side plates that upwardly stand from a circumferential edge thereof and second side plates that are positioned between said first side plates that upwardly stand from said second portion, and a space surrounded by the second portion of said bottom plate and said first side plates is partitioned on said foundation and a top plate blocks the opening at the top of said space.

7. The assembly according to claim 2, wherein said mounting base includes a waterproof layer covering said foundation, and a portion that externally extends from the second portion of said bottom plate of said waterproof layer is connected to a waterproof layer of said concrete structure.

8. The mounting base according to claim 1, wherein a fill hole for filling said cement cured object into the space between said concrete structure and said bottom plate is provided at a predetermined position of said bottom plate.

9. The mounting base according to claim 1, wherein a confirmation hole for confirming the state of said cement cured object filled into the space between said concrete structure and said bottom plate is provided at a predetermined position of said bottom plate.

10. The mounting base according to claim 1, wherein said mounting base includes height-adjusting bolts screwed into screwing holes opening said bottom plate that adjust the height dimension of said foundation, and the height dimension of said space and the height dimension of said foundation from said concrete structure can be adjusted by adjusting the screwing position relative to said bottom plate of said height-adjusting bolts.

* * * * *